United States Patent
Tu et al.

(10) Patent No.: US 8,213,503 B2
(45) Date of Patent: Jul. 3, 2012

(54) SKIP MODES FOR INTER-LAYER RESIDUAL VIDEO CODING AND DECODING

(75) Inventors: Chengjie Tu, Sammamish, WA (US); Shankar Regunathan, Bellevue, WA (US); Shijun Sun, Redmond, WA (US); Chih-Lung Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 929 days.

(21) Appl. No.: 12/205,689

(22) Filed: Sep. 5, 2008

(65) Prior Publication Data
US 2010/0061447 A1    Mar. 11, 2010

(51) Int. Cl.
*H04N 7/12* (2006.01)
(52) U.S. Cl. ......... 375/240.03; 375/240.11; 375/240.12; 375/240.13; 375/240.14; 375/240.15; 382/236; 382/233
(58) Field of Classification Search ............. 375/240.25, 375/240.16, 240.13, 240.03, 240.11–15, 375/25–26; 382/233, 236
See application file for complete search history.

(56) References Cited

U.S. PATENT DOCUMENTS

| | | |
|---|---|---|
| 5,136,377 A | 8/1992 | Johnston et al. |
| 5,300,949 A | 4/1994 | Rodriquez et al. |
| 5,414,469 A | 5/1995 | Gonzales et al. |
| 5,565,920 A | 10/1996 | Lee et al. |
| 5,611,038 A | 3/1997 | Shaw et al. |
| 5,764,296 A | 6/1998 | Shin |
| RE35,910 E | 9/1998 | Nagata et al. |
| 5,821,986 A | 10/1998 | Yuan et al. |
| 5,828,421 A | 10/1998 | Boyce et al. |
| 5,864,637 A | 1/1999 | Liu et al. |
| 5,970,173 A | 10/1999 | Lee et al. |
| 6,002,801 A | 12/1999 | Strongin et al. |

(Continued)

FOREIGN PATENT DOCUMENTS

CN    1378384    11/2002

(Continued)

OTHER PUBLICATIONS

Jianwei Niu1; Rui Fie1; Jianping Hu, MPEG-4 video encoder based on DSP-FPGA techniques, 2005 International Conference on Communications, Circuits and Systems. vol. I. Communication Theory and Systems (IEEE Cat. No. 05EX1034).*

(Continued)

*Primary Examiner* — David Pearson
*Assistant Examiner* — Angela Holmes
(74) *Attorney, Agent, or Firm* — Klarquist Sparkman, LLP

(57) ABSTRACT

Techniques and tools for skip modes in encoding and decoding of inter-layer residual video are described. For example, an encoder encodes multiple macroblocks of a picture of inter-layer residual video. For a current macroblock that is skipped, the encoder selects a skip mode from among multiple available skip modes and uses the selected skip mode when encoding the current macroblock. The skip modes can include intra skip mode and predicted-motion skip mode. A corresponding decoder, for the current macroblock, selects and uses the skip mode for the current macroblock during decoding. As another example, an encoder encodes multiple channels of a picture of inter-layer residual video. For each channel, the encoder determines whether to skip the channel. The encoder signals channel skip information to indicate which channels are skipped. A corresponding decoder parses the channel skip information and determines on a channel-by-channel basis whether to skip the respective channels.

29 Claims, 12 Drawing Sheets software 180 implementing skip modes for inter-layer residual video coding and/or decoding

U.S. PATENT DOCUMENTS

| | | | |
|---|---|---|---|
| 6,104,434 | A | 8/2000 | Nakagawa et al. |
| 6,229,570 | B1 | 5/2001 | Bugwadia et al. |
| 6,239,847 | B1 | 5/2001 | Deierling |
| 6,259,741 | B1 | 7/2001 | Chen et al. |
| 6,339,434 | B1 | 1/2002 | West et al. |
| 6,418,166 | B1 | 7/2002 | Wu et al. |
| 6,456,663 | B1 | 9/2002 | Kim |
| 6,499,060 | B1 | 12/2002 | Wang et al. |
| 6,501,484 | B1 | 12/2002 | Porter |
| 6,510,177 | B1 | 1/2003 | De Bonet et al. |
| 6,529,631 | B1 | 3/2003 | Peterson et al. |
| 6,535,555 | B1 | 3/2003 | Bordes et al. |
| 6,600,785 | B1 | 7/2003 | Nishigori et al. |
| 6,678,424 | B1 | 1/2004 | Ferguson |
| 6,700,933 | B1 | 3/2004 | Wu et al. |
| 6,728,317 | B1 | 4/2004 | Demos |
| 6,823,014 | B2 | 11/2004 | Kim |
| 6,873,368 | B1 | 3/2005 | Yu et al. |
| 6,937,291 | B1 | 8/2005 | Gryskiewicz |
| 6,992,725 | B2 | 1/2006 | Mohsenian |
| 6,993,078 | B2 | 1/2006 | Hall et al. |
| 7,010,037 | B2 | 3/2006 | Ye et al. |
| 7,072,525 | B1 | 7/2006 | Covell |
| 7,154,952 | B2 | 12/2006 | Tourapis et al. |
| 7,200,275 | B2 | 4/2007 | Srinivasan et al. |
| 7,233,362 | B2 | 6/2007 | Wu |
| 7,317,759 | B1 | 1/2008 | Turaga et al. |
| 7,375,767 | B2 | 5/2008 | Lee et al. |
| 7,570,834 | B2 | 8/2009 | Deshpande |
| 7,653,133 | B2 | 1/2010 | Woods et al. |
| 7,747,094 | B2 | 6/2010 | Sekiguchi et al. |
| 2002/0037047 | A1 | 3/2002 | Van Der Schaar et al. |
| 2002/0064226 | A1 | 5/2002 | Bauer et al. |
| 2002/0159484 | A1 | 10/2002 | Azizoglu et al. |
| 2002/0181583 | A1 | 12/2002 | Ribas |
| 2002/0181586 | A1 | 12/2002 | Kondo et al. |
| 2002/0186890 | A1 | 12/2002 | Lee et al. |
| 2002/0186894 | A1 | 12/2002 | Ferguson |
| 2003/0026339 | A1 | 2/2003 | Presquet-Popescu et al. |
| 2003/0099298 | A1 | 5/2003 | Rose et al. |
| 2003/0133500 | A1 | 7/2003 | Auwera et al. |
| 2003/0161401 | A1 | 8/2003 | Shen et al. |
| 2004/0013195 | A1 | 1/2004 | Panusopone et al. |
| 2004/0042549 | A1 | 3/2004 | Huang et al. |
| 2004/0213345 | A1 | 10/2004 | Holcomb et al. |
| 2004/0264567 | A1 | 12/2004 | Xu et al. |
| 2005/0018771 | A1 | 1/2005 | Bourge et al. |
| 2005/0157791 | A1 | 7/2005 | Sun |
| 2005/0195896 | A1 | 9/2005 | Huang et al. |
| 2005/0195900 | A1 | 9/2005 | Han |
| 2005/0259729 | A1 | 11/2005 | Sun |
| 2005/0281333 | A1 | 12/2005 | Ghanbari |
| 2006/0008006 | A1 | 1/2006 | Cha et al. |
| 2006/0013305 | A1 | 1/2006 | Sun |
| 2006/0072672 | A1 | 4/2006 | Lin et al. |
| 2006/0072673 | A1 | 4/2006 | Lin et al. |
| 2006/0083303 | A1 | 4/2006 | Han et al. |
| 2006/0083308 | A1 | 4/2006 | Schwarz et al. |
| 2006/0093036 | A1 | 5/2006 | Park et al. |
| 2006/0133485 | A1 | 6/2006 | Park et al. |
| 2006/0133503 | A1 | 6/2006 | Park et al. |
| 2006/0146937 | A1 | 7/2006 | Ye et al. |
| 2006/0153465 | A1 | 7/2006 | Zhang et al. |
| 2006/0159173 | A1 | 7/2006 | Ye et al. |
| 2006/0165302 | A1 | 7/2006 | Han et al. |
| 2006/0193388 | A1 | 8/2006 | Woods et al. |
| 2006/0262985 | A1* | 11/2006 | Chen et al. ............... 382/240 |
| 2006/0268991 | A1 | 11/2006 | Segall et al. |
| 2006/0285594 | A1 | 12/2006 | Kim et al. |
| 2007/0014349 | A1 | 1/2007 | Bao et al. |
| 2007/0018669 | A1 | 1/2007 | Gearhardt et al. |
| 2007/0053431 | A1 | 3/2007 | Cammas et al. |
| 2007/0091997 | A1 | 4/2007 | Fogg et al. |
| 2007/0121723 | A1 | 5/2007 | Mathew et al. |
| 2007/0140354 | A1 | 6/2007 | Sun |
| 2007/0153896 | A1 | 7/2007 | Song et al. |
| 2007/0160126 | A1 | 7/2007 | Van Der Meer et al. |
| 2007/0160153 | A1 | 7/2007 | Sullivan |
| 2007/0171969 | A1 | 7/2007 | Han et al. |
| 2007/0201551 | A1 | 8/2007 | Wang et al. |
| 2007/0217500 | A1 | 9/2007 | Gao et al. |
| 2007/0223579 | A1 | 9/2007 | Bao |
| 2007/0223582 | A1 | 9/2007 | Borer |
| 2007/0230575 | A1* | 10/2007 | Han ........................ 375/240.13 |
| 2007/0274396 | A1 | 11/2007 | Zhang et al. |
| 2008/0008249 | A1 | 1/2008 | Yan |
| 2008/0013630 | A1 | 1/2008 | Li et al. |
| 2008/0084930 | A1 | 4/2008 | Sekiguchi et al. |
| 2008/0089417 | A1 | 4/2008 | Bao et al. |
| 2008/0095235 | A1 | 4/2008 | Hsiang |
| 2008/0123947 | A1 | 5/2008 | Moriya et al. |
| 2008/0152000 | A1 | 6/2008 | Kaushik |
| 2008/0165848 | A1 | 7/2008 | Yan et al. |
| 2008/0304567 | A1 | 12/2008 | Boyce et al. |
| 2009/0003718 | A1 | 1/2009 | Liu et al. |
| 2009/0060034 | A1 | 3/2009 | Park et al. |
| 2009/0060050 | A1 | 3/2009 | Park et al. |
| 2009/0207912 | A1 | 8/2009 | Holcomb et al. |
| 2009/0219994 | A1 | 9/2009 | Tu et al. |
| 2009/0262798 | A1 | 10/2009 | Chiu et al. |
| 2010/0142615 | A1 | 6/2010 | Han |

FOREIGN PATENT DOCUMENTS

| | | |
|---|---|---|
| CN | 1465193 | 12/2003 |
| EP | 1 401 211 | 3/2004 |
| EP | 1 617 677 | 1/2006 |
| JP | 4-207684 | 7/1992 |
| JP | 2000-506687 | 5/2000 |
| JP | 2000-165661 | 6/2000 |
| JP | 2000-165866 | 6/2000 |
| JP | 2000-242774 | 9/2000 |
| JP | 2001-197527 | 7/2001 |
| JP | 2002-152498 | 5/2002 |
| JP | 2004-506355 | 2/2004 |
| JP | 2005-217940 | 8/2005 |
| JP | 2006-521039 | 9/2006 |
| JP | 2007-519273 | 7/2007 |
| JP | 2007-538439 | 12/2007 |
| JP | 2008-035029 | 2/2008 |
| RU | 2191469 | 10/2002 |
| SU | 1506554 | 9/1989 |
| WO | WO 98/41029 | 9/1998 |
| WO | WO 99/09748 | 2/1999 |
| WO | 00/33581 | 6/2000 |
| WO | 00/74385 | 12/2000 |
| WO | 01/95633 | 12/2001 |
| WO | WO 02/01881 | 1/2002 |
| WO | WO 02/054777 | 7/2002 |
| WO | WO 02/085026 | 10/2002 |
| WO | 02/096120 | 11/2002 |
| WO | WO 03/007619 | 1/2003 |
| WO | WO 03/061294 | 7/2003 |
| WO | WO 2004/036919 | 4/2004 |
| WO | 2006/006777 | 1/2006 |
| WO | 2006/079997 | 8/2006 |
| WO | 2006/112620 | 10/2006 |
| WO | 2006/125713 | 11/2006 |
| WO | 2007/008286 | 1/2007 |
| WO | 2007/009875 | 1/2007 |
| WO | WO 2007/018669 | 2/2007 |
| WO | 2007/042365 | 4/2007 |
| WO | WO 2007/114617 | 10/2007 |
| WO | 2008/004816 | 1/2008 |

OTHER PUBLICATIONS

Abhayaratne, "2D Wavelet Transforms with a Spatially Adaptive 2D Low Pass Filter," *Signal Processing Symp.*, pp. 93-96 (Jun. 2004).

Abhayaratne, "Spatially Adaptive Integer Lifting with No Side Information for Lossless Video Coding," *Picture Coding Symp.*, 6 pp. (Apr. 2003).

Andreopoulos et al., "Complete-to-Overcomplete Discrete Wavelet Transforms for Scalable Video Coding with MCTF," *Proc. SPIE Visual Communications and Image Processing*, pp. 719-731 (Jul. 2003).

Bjontegaard et al., "H.263 Anchors—Technical Description," MPEG95/0322 (1995).

Chen et al., "Improved MC-EZBC with Quarter-pixel Motion Vectors," ISO/IEC JTC1/SC29/WG11, MPEG2002/m8366, Fairfax (2002).

Chen et al., "Improvements to the MC-EZBC Scalable Video Coder," ICIP 2003, vol. 2, pp. 14-17 (Sep. 2003).

ISO/IEC JTC1/SC29/WG11 MPEG2004/M11126, "Spatial Scalability in 3D Wavelet Coding with Spatial Domain MCTF Encoder," 14 pp. (Jul. 2004).

Li et al., "All-phase Motion Compensated Prediction for High Performance Video Coding," Proc. ICIP, vol. 3, pp. 538-541 (2001).

Netravali et al., "Adaptive Quantization of Picture Signals Using Spatial Masking," *Proc. IEEE*, vol. 65, pp. 536-548 (1977).

Piella et al., "An Adaptive Update Lifting Scheme with Perfect Reconstruction," *IEEE Int'l Conf. on Image Processing*, vol. 3, pp. 190-193 (Oct. 2001).

Supplementary European Search Report dated Dec. 19, 2011, for European Patent Application No. EP 09811936.5, 8 pp.

Turaga et al., "Content-adaptive filtering in the UMCTF framework," *IEEE Proc. Int'l Conf. on Acoustics, Speech and Signal Processing*, vol. 3, pp. 621-624 (Apr. 2003).

Wu et al., "Bit-depth scalability compatible to H.264/AVC-scalable extension," *J. Vis. Commun. Image R.*, vol. 19, pp. 372-381 (Jun. 2008).

Yang et al., "A Novel Adaptive De-Interlacing Algorithm Based on Motion Compensation," *Microelectronics and Computer*, Issue 9, pp. 4-6 (Sep. 30, 2002).

Ye et al., "Fully Scalable 3-D Overcomplete Wavelet Video Coding using Adaptive Motion Compenstated Temporal Filtering," *Proc. SPIE Visual Communications and Image Processing*, pp. 1169-1180 (Jul. 2003).

U.S. Appl. No. 11/127,001.
U.S. Appl. No. 11/126,997.
U.S. Appl. No. 11/126,650.
U.S. Appl. No. 11/650,531.
U.S. Appl. No. 13/102,943.
U.S. Appl. No. 12/074,030.
U.S. Appl. No. 12/077,768.
U.S. Appl. No. 12/205,689.
U.S. Appl. No. 12/197,922.

Andreopoulos et al., "A New Method for Complete-to-Overcomplete Discrete Wavelet Transforms," *Proc. IEEE Conf. Digital Signal Proc.*, 4 pp. (Jul. 2002).

Andreopoulos et al., "Fully-Scalable Wavelet Video Coding Using In-Band Motion Compensated Temporal Filtering," *IEEE International Conference on Acoustics, Speech, and Signal Processing. IEEE*, 4 pp. (Apr. 2003).

Andreopoulos et al., "Wavelet-Based Fully-Scalable Video Coding With In-Band Prediction," *Proc. 3rd IEEE Benelux Signal Processing Symposium* (SPS-2002), pp. S02 1 to S02-4 (Mar. 2002).

Anonymous, "Video Subgroup Schedule, 68th MPEG Meeting," 6 pp. (Mar. 2004).

Brainard et al., "Composite Television Coding: Subsampling and Interpolation," SMPTE Journal, pp. 717-724 (Aug. 1982).

Catmull et al., "A Class of Local Interpolating Splines," Computer Aided Geometric Design, Academic Press, pp. 317-326 (Mar. 1974).

Chang et al., "A Scalable Video Compression Technique Based on Wavelet Transform and MPEG Coding" *IEEE Trans. on Consumer Electronics*, vol. 45, No. 3, pp. 788-793 (Aug. 1999).

Chen et al., "Adaptive Joint Source-Channel Coding using Rate Shaping," *ICASSP*, 4 pp. (May 2002).

Chen et al., "Bidirectional MC-EZBC with Lifting Implementation," 26 pp. (document marked May 2003).

Chen et al., "Frame Loss Error Concealment for SVC," J Zhejiang Univ. Science A, vol. 7(5): 677-683 (2006), 7 pages.

Choi et al., "Motion-compensated 3-D subband coding of video," *IEEE Trans. on Image Processing*, vol. 8, No. 2, pp. 155-167 (Feb. 1999).

Chooi et al., "3D Subband Coder for Very Low Bit Rates" *IEEE*, pp. 405-408 (Apr. 1994).

"DivX Multi Standard Video Encoder," 2 pp. (Downloaded from the World Wide Web on Jan. 24, 2006).

Dufaux et al., "Abstract: Motion-compensated generic coding of video based on a multi resolution data structure," 2 pp. (1993) [downloaded from the World Wide Web on Jan. 25, 2006].

Einarsson et al., "Mixed Resolution Video Coding for Low Bit-Rate Channels," *Proc. Int'l Workshop on Coding Techniques for Very Low Bit-Rate Video: VLBV97*, Linköping, Sweden, pp. 77-80 (Jul. 1997).

Gharavi et al., "Video Coding and Distribution over ATM for Multipoint Teleconferencing," GLOBECOM '93, 7 pp. (1993).

Han et al., "Robust and Efficient Scalable Video Coding with Leaky Prediction," Information Systems Laboratory, Stanford University, pp. II-41 through II-44; 5 pages. http://66.102.1.104/scholar?hl=en&lr=&q=cache:fp7Qa34oceJ:viola.usc.edu/paper/icip2002/pdfs/2433.pdf.

International Search Report and Written Opinion dated Mar. 22, 2010, from PCT Patent Application No. PCT/US2009/053985, 6 pp.

ISO/IEC, "ISO/IEC 11172-2: Information Technology—Coding of Moving Pictures and Associated Audio for Storage Media at up to About 1.5 Mbit/s," 122 pp. (Aug. 1993).

ISO/IEC 14496-10, Joint Video Team (JVT) of ISO/IEC MPEG & ITU-T VCEG, Joint Draft 6, Apr. 2006, 527 pgs.

ISO/IEC, "Information Technology—Coding of Audio-Visual Objects: Visual, ISO/IEC 14496-2, Committee Draft," 330 pp. (Mar. 1998).

ISO/IEC JTC1/SC29/WG11 MPEG2003/N6193, "Call for Proposals on Scalable Video Coding Technology," 12 pp. (Dec. 2003).

ISO/IEC JTC1/SC29/WG11 MPEG2004/W6383, "Subjective test results for the CfP on Scalable Video Coding Technology," 17 pp. (Mar. 2004).

ITU, Recommendation H.261, "Line Transmission of Non-Telephone Signals," 28 pp. (Mar. 1993).

ITU-T, "ITU-T Recommendation H.262: Information Technology—Generic Coding of Moving Pictures and Associated Audio Information: Video," 218 pp. (Jul. 1995).

ITU-T, "ITU-T Recommendation H.263: Video Coding for Low Bit Rate Communication," 167 pp. (Feb. 1998).

ITU, "ITU-T Recommendation H.264: Advanced Video Coding for generic audiovisual services," 281 pp. (May 2003).

Iwahashi et al., "A Motion Compensation Technique for Downscaled Pictures in Layered Coding," *IEICE Transactions on Comm.*, vol. E77-B, No. 8, pp. 1007-1012 (Aug. 1994).

Ji et al., "Architectures of Incorporating MPEG-4 AVC into Three-Dimensional Wavelet Video Coding," *Picture Coding Symposium 2004*, 6 pp. (Dec. 2004).

Ji et al., "Three-Dimensional Subband Scalable Video Coding Embedded with H.264/AVC/ Codec," Proc of SPIE, vol. 5960, pp. 201-209, 9 pages. http://research.microsoft.com/~fengwu/papers/base_vcip_05.PDF.

Joint Video Team (JVT) of ISO/IEC MPEG & ITU-T VCEG, "Joint Final Committee Draft (JFCD) of Joint Video Specification," JVT-D157, 207 pp. (Aug. 2002).

Joint Video Team (JVT) of ISO/IEC MPEG and ITU-T VCEG, "Draft of Joint Scalable Video Model JSVM-4 Annex G," JVT-Q201, Nice, France, 166 pp. (Oct. 2005).

Joint Video Team (JVT) of ISO/IEC MPEG and ITU-T VCEG, "Joint Draft 7 of SVC Amendment (revision 2)," JVT-T201r2, Annex G, Klagenfurt, Austria, pp. i-xvii, 353-540 (Jul. 2006).

Karlsson et al., "Subband Coding of Video for Packet Networks" *Optical Engineering*, vol. 27, No. 7, pp. 574-586 (Jul. 1988).

Keys, "Cubic Convolution Interpolation for Digital Image Processing," Computer Graphics, vol. ASSP-29, No. 6, pp. 1153-1160 (Dec. 1981).

Kirenko et al., "Modification of 3d Wavelet Scalable Video Coding" Philips Research Laboratories, The Netherlands, 6 pages.

Kwon et al., "Adaptive Bitrate Allocation in Spatial Scalable Video Coding of Fixed Total Bitrate," *IEICE Trans. Fundamentals*, vol. E81-A, No. 5, pp. 950-956 (May 1998).

Luo et al., "Advanced Lifting-based Motion Threading (MTh) Technique for the 3D Wavelet Video Coding," *Proceedings of the SPIE/IEEE Visual Communications and Image Processing (VCIP2003)*, vol. 5150, pp. 707-718 (Jun. 2003).

Luo et al., "Motion Compensated Lifting Wavelet and Its Application in Video Coding," *Proceedings of the IEEE Int. Conf. on Multimedia and Expo*, 4 pp. (Aug. 2001).

Mehrseresht et al., "Adaptively Weighted Update Steps in Motion Compensated Lifting Based on Scalable Video Compression," *Proceedings of the IEEE Int. Conf. on Image Processing*, vol. 2, 4 pp. (Sep. 2003).

Mitchell et al., "Reconstruction Filters in Computer Graphics," Computer Graphics, vol. 22, No. 4 pp. 221-228 (Aug. 1988).

Ohm, "Three Dimensional Subband Coding with Motion Compensation," *IEEE Trans. on Image Processing*, vol. 3, No. 5, pp. 559-571 (Sep. 1994).

Pesquet-Popescu et al., "Three-dimensional Lifting Schemes for Motion Compensated Video Compression," *ICASSP*, vol. 3, 4 pp. (2001).

Printouts of FTP directories from http://ftp3.itu.ch, 8 pp. (downloaded from the World Wide Web on Sep. 20, 2005).

Reader, "History of MPEG Video Compression—Ver. 4.0," 99 pp. (document marked Dec. 16, 2003).

Santa Cruz, "JVT-0061-CE9verif.doc," 2 pp. (downloaded from the World Wide Web on May 10, 2005.).

Schwarz et al., "Overview of the Scalable H.264/Mpeg4-AVC Extension," Fraunhofer Institute for Telecommunications—Heinrich Hertz Institute, Image Processing Dept., 4 pages. http://iphome.hhi.de/marpe/download/icip06_svc.pdf.

Schwarz et al., "Overview of the Scalable Video Coding Extension of the H.264/AVC Standard," IEEE Transactions on Circuits and Systems for Video Technology (Sep. 2007) 18 pages. http://iphome.hhi.de/marpe/download/ieee-7_svc_overview.pdf.

Sebe et al., "An Overcomplete Discrete Wavelet Transform for Video Compression," *IEEE Int'l Conf. on Multimedia and Expo*, 4 pp. (Nov. 2002).

Secker et al., "Highly Scalable Video Compression Using a Lifting-based 3D Wavelet Transform with Deformable Mesh Motion Compensation," *IEEE Int'l Conf. on Image Processing*, vol. 3, 4 pp. (Jun. 2002).

Secker et al., "Lifting-based Invertible Motion Adaptive Transform (LIMAT) Framework for Highly Scalable Video Compression," *IEEE Trans. Image Processing*, vol. 12, 35 pp. (Dec. 2003).

Segall, "Study of Upsampling/Downsampling for Spatial Scalability," JVT-Q083, Nice, France, 18 pp. (Oct. 2005).

Song et al., "Content Adaptive Update Steps for Lifting-Based Motion Compensated Temporal Filtering," *Picture Coding Symposium*, 5 pp. (Dec. 2004).

Sullivan, "Color Format Upconversion for Video Display," JVT-I019, San Diego, 6 pp. (Sep. 2003).

Sullivan et al., "The H.264/AVC Advanced Video Coding Standard: Overview and Introduction to the Fidelity Range Extensions," 21 pp. (Aug. 2004).

Sullivan, "Position Calculation for SVC Upsampling," JVT-R067, Bangkok, Thailand, 7 pp. (Jan. 2006).

Sullivan et al., "Position Calculation for SVC Upsampling," JVT-S067, Geneva, Switzerland, 12 pp. (Mar. 2006).

Sullivan, "Position Calculation for SVC Upsampling," JVT-U067, Hangzhou, China, 7 pp. (Oct. 2006).

Sun et al., "Seamless Switching of Scalable Video Bitstreams for Efficient Streaming," *IEEE Transactions on Multimedia*, vol. 6, No. 2, pp. 291-303 (Apr. 2004).

Sun et al., "Unified Solution for Spatial Scalability," JVT-R018, Bangkok, Thailand, 6 pp. (Jan. 2006).

Tomasi et al., "Bilateral Filtering for Gray and Color Images," *IEEE Int'l Conf. on Computer Vision*, 8 pp. (Jan. 1998).

Video Compression 1: H 261—Multimedia Systems (Module 4 Lesson 2), 5 pp. (document not dated).

Voloshynovskiy et al., "A Stochastic Approach to Content Adaptive Digital Image Watermarking," 26 pp. (Sep. 1999).

Wang et al., "Adaptive Image Matching in the Subband Domain," *Proc. SPIE*, 12 pp. (Dec. 2004).

Wang et al., "WZS: Wyner-Ziv Scalable Predictive Video Coding," Integrated Media Systems Center and Department of Electrical Engineering, University of Southern California, 6 pages. http://www.ece.ucdavis.edu/PCS2004/pdf/ID110_pcs04/pdf.

Wien, "Variable Block-Size Transforms for Hybrid Video Coding," Dissertation, 182 pp. (Feb. 2004).

Wu et al., "SMART: An Efficient, Scalable and Robust Streaming Video System," *EURASIP on Applied Signal Processing*, vol. 2, 39 pp. (Feb. 2004).

Xiong et al., "Exploiting Temporal Correlation with Adaptive Block-size Motion Alignment for 3D Wavelet Coding," *SPIE/IEE Visual Communications and Image Processing (VCIP2004)*, 12 pp. (Jan. 2004).

Xiong et al., "Spatial Scalability in 3D Wavelet Coding with Spatial Domain MCTF Encoder," *Picture Coding Symposium*, 6 pp. (Dec. 2004).

Xu et al., "3D Sub-band Video Coding Using Barbell Lifting," MPEG2004/M10569/S05, 14 pp. (downloaded from the World Wide Web on May 10, 2005.).

Xu et al., "Three-Dimensional Embedded Subband Coding with Optimal Truncation (3D ESCOT," *Applied and Computational Harmonic Analysis*, pp. 290-315 (May 2001).

Zhao et al., "Macroblock Skip-Mode Prediction for Complexity Control of Video Encoders," *IEEE Int'l Conf. on Visual Information Engineering*, 4 pp. (Jul. 2003).

\* cited by examiner software 180 implementing skip modes for inter-
layer residual video coding and/or decoding If (pred_type_of($MB_{left}$) == P) and (pred_type_of($MB_{top}$) == P)
  skip_mode = $S_P$
else
  skip_mode = $S_I$

Figure 6 current channel 1110 of current picture of inter-layer residual video
chroma(V)

not skipped: encode channel zero skip mode: zero skip values copy skip mode: copy values of corresponding channel of reference picture 1130 luma(Y)
chroma(U)
chroma(V)
reference picture 1130 of inter-layer residual video

SKIP MODES FOR INTER-LAYER RESIDUAL VIDEO CODING AND DECODING

BACKGROUND

Engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system.

When it converts video to a lower bit rate form, a video encoder can decrease the quality of the compressed video to reduce bit rate. By selectively removing detail in the video, the encoder makes the video simpler and easier to compress, but the compressed video is less faithful to the original video. Aside from this basic quality/bit rate tradeoff, the bit rate of the video depends on the content (e.g., complexity) of the video and the format of the video.

Video information is organized according to different formats for different devices and applications. Attributes of video format can include color space, chroma sampling rate, sample depth, spatial resolution and temporal resolution. Typically, quality and bit rate vary directly for spatial resolution (e.g., detail in a picture) and temporal resolution (e.g., number of pictures per second), with higher resolution resulting in higher quality and higher bit rate.

In video encoding and decoding applications, common color spaces include YUV and YCbCr. Y indicates the brightness (luma) channel of the video, while U and V, or Cb and Cr, indicate color (chroma) channels of the video. Aside from YUV and YCbCr, many other color spaces organize video in a luma channel and chroma channels. Chroma sampling rate refers to sampling rate of the chroma channels of video relative to the luma channel.

Each picture element ("pixel") of a video picture includes one or more samples, and each sample is digitally represented with one or more bits. Using higher sample depth allows for greater precision in sample values, or allows for capturing a wider color gamut. For example, 12-bit sample values have more possible values than 10-bit sample values or 8-bit sample values. As a tradeoff for this higher quality, higher sample depth tends to increase bit rate for encoding and decoding applications.

Scalable video encoding and decoding facilitate delivery of video to devices with different capabilities. A typical scalable video encoder splits video into a base layer and one or more enhancement layers. The base layer by itself provides a version of the video for reconstruction at a lower resolution, and the enhancement layer(s) can be added to provide extra information that will increase video quality. Some scalable encoders and decoders rely on temporal scalability of video. Other common scalable encoding/decoding schemes involve scalability for either the spatial resolution or the overall encoding quality of the video.

Many existing scalable video encoders and decoders use a skip mode for a macroblock when the bit stream of encoded video lacks data for the macroblock. A macroblock is an arrangement of samples in a picture, typically organized as a set of blocks of samples in different channels. The definition of a skipped macroblock depends on the encoder and decoder. Some scalable video encoders and decoders also allow entire pictures to be skipped in the bit stream. While skip modes in existing scalable video encoders and decoders provide acceptable performance in many scenarios, they do not have the benefits and advantages of the techniques and tools described below.

SUMMARY

In summary, the detailed description presents techniques and tools for skip modes in encoding and decoding of inter-layer residual video. In many encoding and decoding scenarios, using the skip modes helps improve quality and/or reduce bit rate by efficiently representing common patterns of values in the inter-layer residual video.

According to a first aspect of the techniques and tools described herein, a tool such as an encoder or decoder processes multiple macroblocks of a current picture of inter-layer residual video. For a current macroblock that is skipped, the tool selects a skip mode from among multiple available skip modes and uses the selected skip mode for the current macroblock.

For example, during encoding, an encoder encodes inter-layer residual video to produce part of an enhancement layer bit stream. For a current macroblock that is skipped, the encoder selects a skip mode from among multiple available skip modes and uses the selected skip mode to encode the current macroblock. The encoder evaluates the results of encoding and decides whether the current macroblock should be skipped. After making the skipped/not skipped decision, the encoder signals macroblock skip information in the enhancement layer bit stream to indicate the skipped/not skipped decision. Or, during decoding, a decoder receives part of an enhancement layer bit stream and decodes inter-layer residual video. The decoder parses macroblock skip information that indicates whether or not a current macroblock is skipped. When the current macroblock is skipped, the decoder selects a skip mode from among multiple available skip modes and uses the selected skip mode to decode the current macroblock.

The tool can select a skip mode for a current skipped macroblock using a derivation rule. For example, the tool determines context information (such as macroblock type) for each of one or more context macroblocks in a picture, then determines the skip mode for the current skipped macroblock based upon the context information. Or, the tool selects the skip mode depending on whether the context macroblock(s) use motion compensation. Alternatively, the tool uses another derivation rule.

The multiple available skip modes can include an intra skip mode (according to which a skipped macroblock is assigned defined intra skip values and uses no motion compensation) and a predicted-motion skip mode (according to which a skipped macroblock is assigned values from motion compensation with predicted motion). Alternatively, the multiple available skip modes include other and/or additional skip modes for skipped macroblocks.

According to a second aspect of the techniques and tools described herein, a tool such as an encoder or decoder processes multiple macroblocks of a current intra-coded picture of inter-layer residual video. As part of the processing, for a current macroblock that is skipped, the tool selects and uses intra skip mode, assigning defined intra skip values to the current macroblock. A bit stream of encoded data for the inter-layer residual video includes macroblock skip information indicating which macroblocks of the current intra-coded picture are skipped.

According to a third aspect of the techniques and tools described herein, a tool such as an encoder or decoder processes multiple channels of inter-layer residual video. For each of the multiple channels, the tool determines whether to skip the channel of the inter-layer residual video. If so, the tool processes the channel as skipped. Otherwise, the tool processes the channel as coded. A bit stream of encoded data for the inter-layer residual video includes channel skip information indicating which of the channels are skipped.

For example, an encoder encodes inter-layer residual video to produce part of a bit stream of encoded data for the inter-layer residual video. As part of the encoding, the encoder determines for each of multiple channels of the inter-layer residual video whether to skip the channel. In the bit stream, the encoder signals channel skip information indicating which of the multiple channels are skipped. Or, a corresponding decoder receives part of a bit stream of encoded data for inter-layer residual video and decodes the inter-layer residual video. As part of the decoding, the decoder parses, from the bit stream, channel skip information indicating which of multiple channels are skipped, and determines on a channel-by-channel basis whether to skip the respective channels.

For each of the multiple channels, the channel skip information can include a code that indicates whether the channel is skipped or not skipped. Or, the channel skip information includes a code that indicates whether a given channel in a current picture is: (a) skipped using zero skip values, (b) skipped by copying values of a corresponding channel from a reference picture, or (c) not skipped. Or, the channel skip information includes codes indicating other and/or additional channel skip options.

The foregoing and other objects, features, and advantages will become more apparent from the following detailed description, which proceeds with reference to the accompanying figures. This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

FIG. 6 is a diagram illustrating derivation of example skip modes for skipped macroblocks of inter-layer residual video.

DETAILED DESCRIPTION

Figure 1:
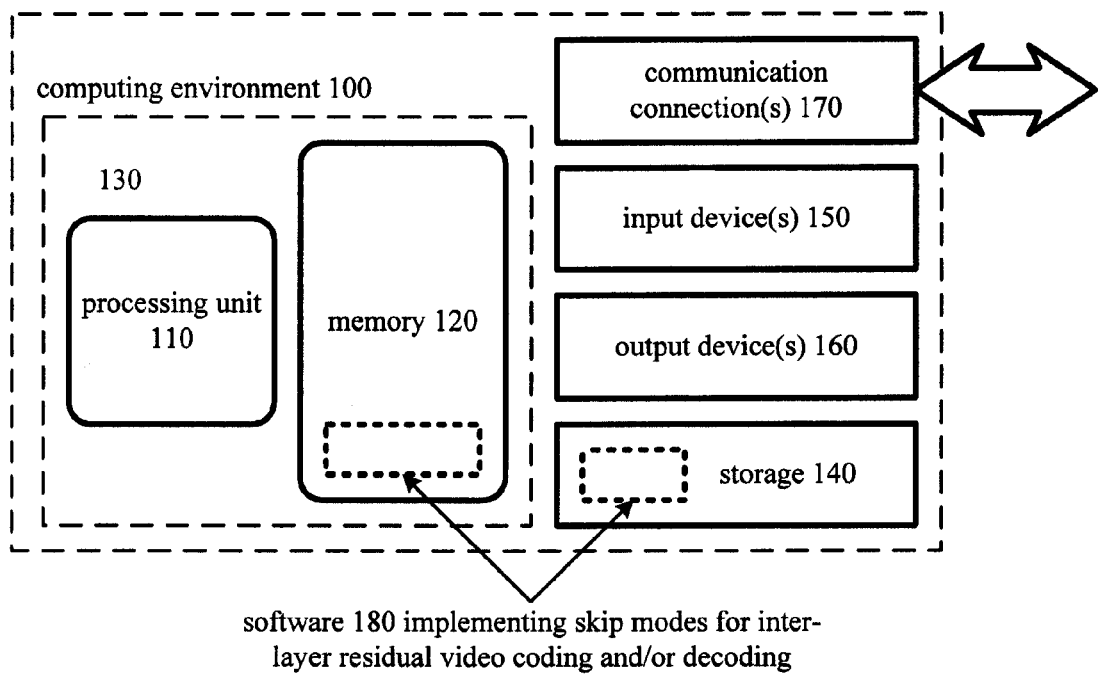
FIG. 1 is a block diagram of a suitable computing environment in which several described techniques and tools may be implemented.

The present application relates to techniques and tools for skip modes in encoding and decoding of inter-layer residual video. In particular, the skip modes help improve the efficiency of encoding inter-layer residual video by allowing macroblock skip modes for intra-coded inter-layer residual video content, by switching between different macroblock skip modes for inter-layer residual video content and/or by using channel skip modes for inter-layer residual video content.

For example, in some scalable video encoding and decoding scenarios, a base layer encoder encodes base layer video at a lower sample depth and chroma sampling rate (e.g., 4:2:0 video with 8-bit samples) than input video. Typically, the base layer encoding also introduces distortion. Inter-layer residual video, which represents differences between the input video and a reconstructed version of the base layer video, includes details for higher sample depth, higher chroma sampling rate and/or higher encoding quality (e.g., 4:2:2 video with 10-bit samples). An enhancement layer encoder encodes the inter-layer residual video. By using efficient skip modes to represent common patterns of values in the inter-layer residual video, the enhancement layer encoder improves rate-distortion performance.

The enhancement layer encoder can use macroblock skip modes. For example, although many video encoders have macroblock skip modes for inter-coded video content (according to which skipped macroblocks use predicted motion), in some embodiments an enhancement layer encoder uses a skip mode for intra-coded inter-layer residual video content. The intra skip mode accounts for common patterns of values (such as macroblocks with all zero values) in the intra-coded content. As another example, in some embodiments an enhancement layer encoder selects between multiple available macroblock skip modes when encoding inter-layer residual video content. In this way, the encoder can adapt to changes in the video content by switching between skip modes. When the encoder and decoder select skip modes according to context available during encoding and decoding, the bit rate overhead associated with signaling skip modes in a bit stream can be avoided.

The enhancement layer encoder can also use channel skip modes. For example, in some embodiments an enhancement layer encoder uses skip modes for individual channels of inter-layer residual video content. With a channel skip mode that replaces values in a skipped channel with zero values (or values that will result in reconstruction of zero values for the skipped channel), the encoder can effectively address situations in which one channel (e.g., the luma channel when base layer encoding quality is high) has little or no meaningful information while one or more other channels (e.g., chroma channels) have significant values. With a channel skip mode that repeats values from another picture for the values in a skipped channel, the encoder can effectively address situations in which values in one channel do not change significantly from picture to picture, but values in another channel do. By signaling channel skip information for individual channels, the encoder improves rate-distortion performance.

Various alternatives to the implementations described herein are possible. Certain techniques described with reference to flowchart diagrams can be altered by changing the ordering of stages shown in the flowcharts, by splitting, repeating or omitting certain stages, etc. The different aspects of the skip modes can be used in combination or separately. Different embodiments implement one or more of the described skip modes.

Some of the techniques and tools described herein address one or more of the problems noted in the background. Typically, a given technique/tool does not solve all such problems. Rather, in view of constraints and tradeoffs in encoding time, encoding resources, decoding time, decoding resources, available bit rate, and/or quality, the given technique/tool improves performance for a particular implementation or scenario.

I. Computing Environment

FIG. 1 illustrates a generalized example of a suitable computing environment (100) in which several of the described techniques and tools may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing one or more of the described skip modes for inter-layer residual video coding and/or decoding.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing skip modes for inter-layer residual video coding and/or decoding.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "select" and "reconstruct" to describe computer operations in a computing environment. These terms are high-level abstractions for operations performed by a computer, and should not be confused with acts performed by a human being. The actual computer operations corresponding to these terms vary depending on implementation.

II. Generalized Encoding Tool

Figure 2:
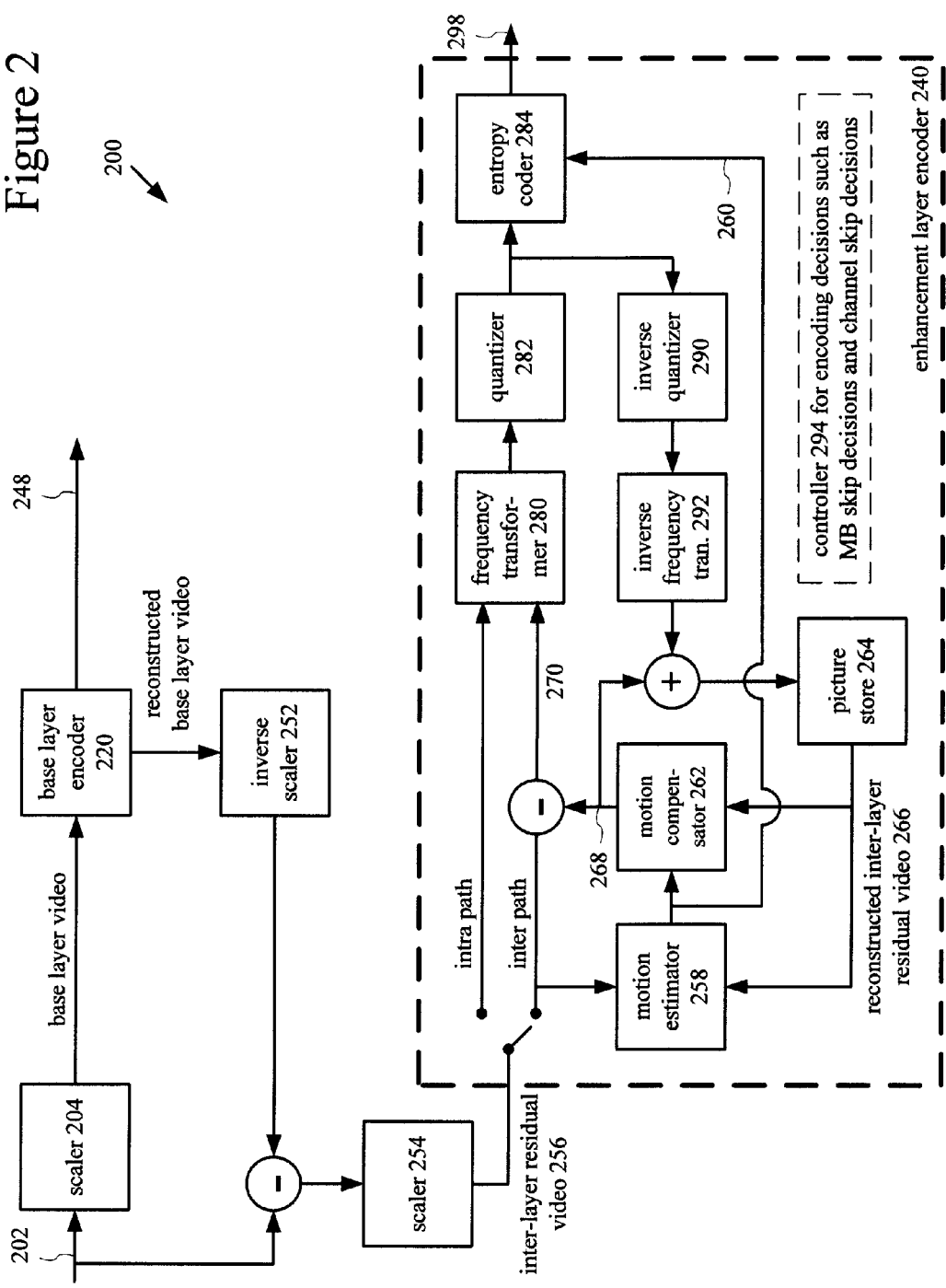
FIG. 2 is a block diagram of a scalable video encoding tool in which several described techniques may be implemented.

FIG. 2 is a block diagram of a generalized scalable video encoding tool (200) in conjunction with which some described techniques may be implemented. The encoding tool (200) receives a sequence of video pictures including an input picture (202) and produces a base layer bit stream (248) and one or more enhancement layer bit streams (298). For the base layer, the format of the output bitstream can be a Windows Media Video format, SMPTE 421-M format, MPEG-x format (e.g., MPEG-1, MPEG-2, or MPEG-4), H.26x format (e.g., H.261, H.262, H.263, or H.264), or other format. For the enhancement layer(s), the format of the output bitstream(s) can be the same as the base layer bitstream or another format.

The tool (200) processes video pictures. The term "picture" generally refers to source, coded, or reconstructed image data. For progressive video, a picture is a progressive video frame. For interlaced video, a picture may refer to an interlaced video frame, the top field of the frame, or the bottom field of the frame, depending on context.

An input picture (202) has a sample depth, chroma sampling rate and/or spatial resolution that is at a higher resolution than the base layer encoder (220) accepts. For example, the base layer encoder (220) is configured to encode video pictures with 8-bit samples and a 4:2:0 chroma sampling rate, and the input picture (202) has 10-bit samples and a 4:2:2 chroma sampling rate, or has another format with higher resolution than 8-bit 4:2:0. Alternatively, the base layer encoder (220) accepts 10-bit samples, 12-bit samples, or samples with some other sample depth, or the base layer encoder (220) accepts 4:2:2 video, 4:4:4 video, or video having some other chroma sampling rate.

The encoding tool (200) includes a first scaler (204) which accepts input video pictures (202) and outputs base layer video to the base layer encoder (220). The first scaler (204) may downsample or otherwise scale the input video pictures (202), for example, to reduce sample depth, spatial resolution and/or chroma sampling resolution. Or, for one or more of these attributes of the input video pictures (202), the first scaler (204) does not alter the input video pictures (202) at all.

The base layer encoder (220) encodes the base layer video and outputs a base layer bit stream (248). In addition, the base layer encoder (220) makes available reconstructed base layer video, which is input to an inverse scaler (252). As part of encoding, the base layer encoder (220) typically produces a reconstructed version of the input picture (202). For example, the base layer encoder (220) decodes and buffers a reconstructed base layer picture for use in later motion compensation. The reconstructed version is thus available from the base layer encoder (220) for further processing in the scalable encoding. (Alternatively, a base layer decoder (not shown) in the encoding tool (200) decodes the base layer bit stream (248) to produce the reconstructed base layer video.)

If the reconstructed base layer video has a different sample depth, spatial resolution, chroma sampling rate, etc. than the input video pictures (202) due to scaling, then the inverse scaler (252) may upsample or otherwise inverse scale the reconstructed base layer video so that it has a higher sample depth, spatial resolution, chroma sampling rate, etc. (e.g., the same sample depth, spatial resolution, chroma sampling rate, etc. as the input video pictures (202)). The inverse scaler (252) can also adaptively filter the reconstructed base layer video to remove certain kinds of artifacts. In addition, to compensate for tone mapping during scaling, the inverse scaler (252) can perform inverse tone mapping (e.g., from one color gamut to another) at the same sample depth or a higher sample depth.

The steps of scaling and encoding the input video typically result in some loss of data between the input video and the reconstructed base layer video. Generally, inter-layer residual video represents differences (but not necessarily all differences) between the reconstructed base layer video and the input video. In the tool (200) of FIG. 2, a differentiator subtracts samples of the reconstructed base layer video from corresponding samples of the input video to produce this inter-layer residual video. Before the differentiator, the input video may be additionally filtered. A second scaler (254) scales the inter-layer residual video for input to an enhancement layer video encoder (240). For example, the second scaler (254) remaps the sample values of the inter-layer residual video so that the sample values have a distribution that facilitates effective compression with the enhancement layer video encoder (240).

The enhancement layer encoder (240) compresses the inter-layer residual video and produces an enhancement layer bit stream (298). A "picture" at a given time in the inter-layer residual video represents differences between an input video picture and a reconstructed base layer video picture, but is still encoded as a picture by the example enhancement layer video encoder (240). The encoder (240) compresses inter-coded, predicted pictures of the inter-layer residual video and intra-coded pictures of the inter-layer residual video. For the sake of presentation, FIG. 2 shows a path for intra-coded content through the encoder (240) and a path for inter-coded predicted content. Many of the components of the enhancement layer encoder (240) are used for compressing both intra-coded content and inter-coded, predicted content. The exact operations performed by those components can vary depending on the type of information being compressed.

In general, within the enhancement layer encoder (240), inter-coded, predicted content (as a picture) is represented in terms of prediction from previously reconstructed content (as one or more other pictures, which are typically referred to as reference pictures or anchors). For example, content at a given time is encoded as a progressive P-frame or B-frame, interlaced P-field or B-field, or interlaced P-frame or B-frame. Within the encoder (240), a prediction residual is the difference between predicted information and corresponding original enhancement layer video.

If the inter-layer residual video (256) content is encoded as a predicted picture, a motion estimator (258) estimates motion of macroblocks or other sets of samples of the inter-layer residual video picture with respect to one or more reference pictures, which represent previously reconstructed inter-layer residual video content. The picture store (264) buffers reconstructed inter-layer residual video (266) as a reference picture or pictures. When multiple reference pictures are used, the multiple reference pictures can be from different temporal directions or the same temporal direction. The motion estimator (258) outputs motion information (260) such as motion vector information.

The motion compensator (262) applies motion vectors to the reconstructed inter-layer residual video content (266) (stored as reference picture(s)) when forming a motion-compensated current picture (268). The difference (if any) between a block of the motion-compensated inter-layer residual video (268) and corresponding block of the original inter-layer residual video (256) is the prediction residual (270) for the block. During later reconstruction of the inter-layer residual video, reconstructed prediction residuals are added to the motion compensated inter-layer residual video (268) to obtain reconstructed content closer to the original inter-layer residual video (256). In lossy compression, however, some information is still lost from the original inter-layer residual video (256). Alternatively, a motion estimator and motion compensator apply another type of motion estimation/compensation.

A frequency transformer (280) converts spatial domain video information into frequency domain (i.e., spectral, transform) data. For block-based video content, the frequency transformer (280) applies a DCT, variant of DCT, or other forward block transform to blocks of the samples or prediction residual data, producing blocks of frequency transform coefficients. The frequency transformer (280) may apply an 8×8, 8×4, 4×8, 4×4 or other size frequency transform.

A quantizer (282) then quantizes the blocks of transform coefficients. The quantizer (282) applies non-uniform, scalar quantization to the spectral data with a step size that varies spatially on a picture-by-picture basis, macroblock-by-macroblock basis or other basis. Additionally, in some cases the quantizer varies quantization across color channels of the inter-layer residual video picture. The quantizer (282) can also apply another type of quantization, for example, a uniform or adaptive quantization for at least some spectral data coefficients, or directly quantizes spatial domain data in an encoder system that does not use frequency transformations.

When a reconstructed inter-layer residual video picture is needed for subsequent motion estimation/compensation, an inverse quantizer (290) performs inverse quantization on the quantized spectral data coefficients. An inverse frequency transformer (292) performs an inverse frequency transform, producing blocks of reconstructed prediction residuals (for predicted inter-layer residual video content) or samples (for intra-coded inter-layer residual video content). If the inter-layer residual video (256) was motion-compensation predicted, the reconstructed prediction residuals are added to the motion-compensated predictors (268) to form the reconstructed inter-layer residual video. The picture store (264) buffers the reconstructed inter-layer residual video for use in subsequent motion-compensated prediction.

The entropy coder (284) compresses the output of the quantizer (282) as well as certain side information (e.g., quantization parameter values) Typical entropy coding techniques include arithmetic coding, differential coding, Huffman coding, run length coding, LZ coding, dictionary coding, and combinations of the above. The entropy coder (284) typically uses different coding techniques for different kinds of information, and can choose from among multiple code tables within a particular coding technique.

When the enhancement layer encoder (240) performs intra-compression of the inter-layer residual video, the encoder intra-compresses it as an intra-coded picture, without motion compensation. The inter-layer residual video (256) is provided directly to the frequency transformer (280), quantizer (282), and entropy coder (284) and output as encoded video. A reconstructed version of the intra-coded inter-layer residual video can be buffered for use in subsequent motion compensation of other inter-layer residual video.

In some embodiments, the enhancement layer encoder (240) uses skip modes for macroblocks that are skipped in pictures of inter-layer residual video (256). For example, for skipped macroblocks in an inter-coded picture of the inter-layer residual video (256), the encoder (240) switches between using an intra skip mode and a predicted-motion skip mode. For the intra skip mode, the encoder (240) uses defined intra skip values for the skipped macroblock. The defined intra skip values can simply be zero. Or, if values of the inter-layer residual video are remapped before encoding (and inverse remapped after decoding), the defined intra skip values can be selected such that intra-skipped macroblocks will have zero values after inverse remapping of the values. For the predicted-motion skip mode, the encoder (240) predicts the motion of the skipped macroblock and with the motion compensator (262) determines a motion-compensated prediction used for the skipped macroblock. For skipped macroblocks in an intra-coded picture of the inter-layer residual video (256), the encoder (240) can use the intra skip mode. The encoder (240) signals skipped/not skipped status for the macroblocks in the enhancement layer bit stream (298). The encoder (240) can signal the selected skip modes for skipped macroblocks, or the encoder (240) and a corresponding decoder can derive the selected skip modes without explicit signaling thereof. Details of example macroblock skip modes and derivation rules are presented below. Alternatively, the encoder (240) uses other and/or additional skip modes for skipped macroblocks.

In some embodiments, the enhancement layer encoder (240) uses skip modes for channels that are skipped in pictures of inter-layer residual video (256). For example, for skipped channels in a picture of the inter-layer residual video (256), the encoder (240) switches between using a zero skip mode and a copy skip mode. For the zero skip mode, the encoder (240) uses defined zero skip values for the skipped channel. The defined zero skip values can simply be zero. Or, if values of the inter-layer residual video are remapped before encoding (and inverse remapped after decoding), the defined zero skip values can be selected such that zero-skipped channels will have zero values after inverse remapping of the values. For the copy skip mode, the encoder (240) uses the values of a corresponding channel of a reference picture in the picture store (264). The encoder (240) signals skip modes for the channels in the enhancement layer bit stream (298). Details of example channel skip modes are presented below. Alternatively, the encoder (240) uses other and/or additional skip modes for skipped channels.

A controller (294) receives inputs from various modules such as the motion estimator (258), frequency transformer (280), quantizer (282), inverse quantizer (290), and entropy coder (284). The controller (294) evaluates intermediate results during encoding, for example, setting quantization step sizes and performing rate-distortion analysis, and making skip mode decisions for macroblocks and/or channels. The controller (294) works with other modules to set and change coding parameters during encoding. When the controller (294) evaluates different coding parameter choices, the controller (294) may iteratively perform certain stages to evaluate different parameter settings, or the controller (294) may jointly evaluate different coding parameters. The tree of coding parameter decisions to be evaluated, and the timing of corresponding encoding, depends on implementation. In some embodiments, the controller (294) also receives input from an encoding session wizard interface, other encoder application interface, or other source to designate video to be encoded using specific rules.

Although FIG. 2 shows a single enhancement layer encoder (240), the inter-layer residual video can itself be separated into multiple layers of residual video for encoding with separate residual encoders. For example, a decomposer uses wavelet decomposition or another suitable decomposition mechanism to split the inter-layer residual video into a chroma highpass residual layer and a sample depth residual layer, which are then encoded by a chroma highpass encoder and sample depth residual encoder, respectively, to produce two separate enhancement layer bit streams.

A second controller (not shown) for the encoding tool (200) receives inputs from various modules of the tool (200) and evaluates intermediate results during encoding. The controller works with modules to set and change coding parameters during encoding.

The relationships shown between modules within the tool (200) indicate general flows of information; other relationships are not shown for the sake of simplicity. In particular, FIG. 2 generally does not show side information. Such side information, once finalized, is sent in an output bit stream or side channel. Particular embodiments of scalable video encoding tools typically use a variation or supplemented version of the tool (200). Depending on implementation and the type of compression desired, modules can be added, omitted, split into multiple modules, combined with other modules, and/or replaced with like modules. In alternative embodiments, scalable video encoding tools with different modules and/or other configurations of modules perform one or more of the described techniques for encoding inter-layer residual video with skip modes.

III. Generalized Decoding Tool

Figure 3:
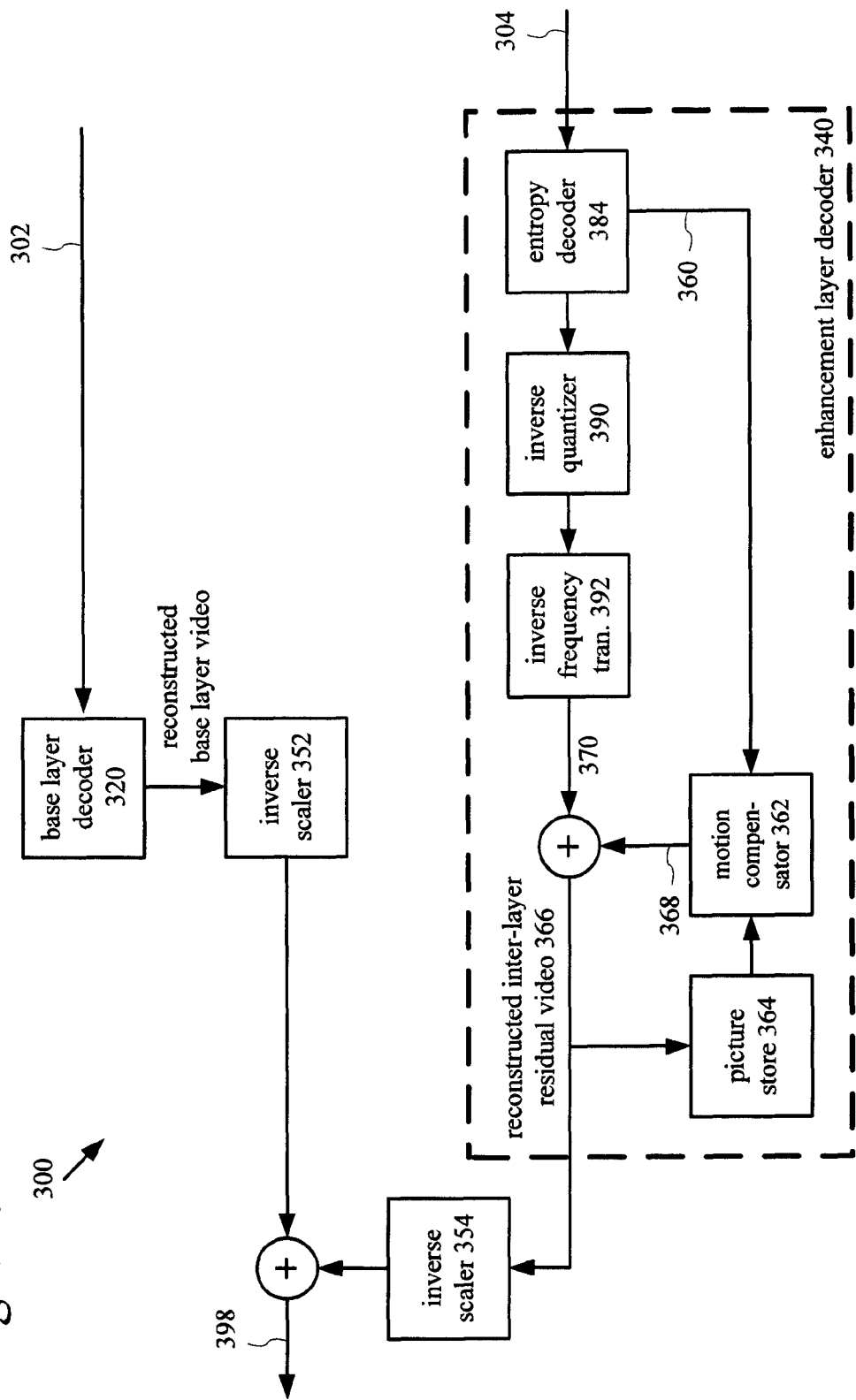
FIG. 3 is a block diagram of a scalable video decoding tool in which several described techniques may be implemented.

FIG. 3 is a block diagram of a generalized scalable video decoding tool (300) in conjunction with which some described techniques may be implemented. The decoding tool (300) receives one or more bit streams of compressed video information (including bit streams for different layers) and produces reconstructed video (398). For base layer video, the format of the base layer bit stream (302) can be a Windows Media Video format, SMPTE 421-M format, MPEG-x format (e.g., MPEG-1, MPEG-2, or MPEG-4), H.26x format (e.g., H.261, H.262, H.263, or H.264), or other format. For inter-layer residual video, the format of the enhancement layer bit stream(s) (304) can be the same as the base layer bit stream (302), or it can be another format.

The decoding tool (300) includes a base layer decoder (320) that receives the base layer bit stream (302) and outputs reconstructed base layer video to a first inverse scaler (352). If the reconstructed base layer video has a different sample depth, spatial resolution, chroma sampling rate, etc. than the output video (due to scaling during encoding), then the first inverse scaler (352) upsamples or otherwise inverse scales the reconstructed base layer video so that it has a higher sample depth, spatial resolution, chroma sampling rate, etc. (e.g., the same sample depth, spatial resolution, chroma sampling rate, etc. as the output video (398)). The first inverse scaler (352) can also adaptively filter the reconstructed base layer video to remove certain kinds of artifacts, and it can perform inverse tone mapping at the same sample depth or a higher sample depth.

The decoding tool (300) also includes an enhancement layer decoder (340) operable to receive an enhancement layer bit stream (304) and output decoded inter-layer residual video to a second inverse scaler (354). In the enhancement layer decoder (340), an entropy decoder (384) is operable to decode elements of the bit stream that were encoded by entropy encoding. An inverse quantizer (390) applies inverse quantization to some of the output of the entropy decoder (384). Generally, the inverse quantizer (390) is operable to reverse quantization applied during encoding.

An inverse frequency transformer (392) accepts the output of the inverse quantizer (390). The inverse frequency transformer (392) is operable to produce blocks of spatial domain values by applying an inverse DCT, variant of inverse DCT, or other reverse block transform to the output of the inverse quantizer (390). The inverse frequency transformer (392) outputs reconstructed values (370) for a prediction residual (in the case of inter-coded inter-layer residual video content) or samples (in the case of intra-coded inter-layer residual video content).

A motion compensator (362) applies motion based on motion vector information (360) to previously reconstructed inter-layer residual video buffered in a picture store (364) and outputs motion-compensation-predicted inter-layer residual video (368). In decoding of inter-coded inter-layer residual video, the motion-compensation-predicted inter-layer residual video (368) is combined with the prediction residuals (370) to form reconstructed inter-layer residual video (366). The reconstructed inter-layer residual video (366) is buffered by the picture store (364) (for use in subsequent motion compensation) and output from the enhancement layer decoder (340) to the second inverse scaler (354).

The decoder (340), using intra-decoding, also decodes intra-coded inter-layer residual video. In that instance, the entropy decoder (384), inverse quantizer (390), and inverse frequency transformer (392) act as previously mentioned to produce samples of the inter-layer residual video, bypassing motion compensation. The reconstructed inter-layer residual video (366) is buffered in a picture store (364) for use in future motion compensation.

In some embodiments, the enhancement layer decoder (340) uses skip modes for macroblocks that are skipped in pictures of inter-layer residual video. For example, the decoder (340) parses skipped/not skipped status information for the macroblocks from the enhancement layer bit stream (304). For skipped macroblocks in an inter-coded picture of the inter-layer residual video, the decoder (340) switches between using an intra skip mode and a predicted-motion skip mode. For the intra skip mode, the decoder (340) uses defined intra skip values (e.g., zero or another selected value that results in zero values after inverse remapping) for the skipped macroblock. For the predicted-motion skip mode, the decoder (340) predicts the motion of the skipped macroblock and with the motion compensator (362) determines a motion-compensated prediction used for the skipped macroblock. For skipped macroblocks in an intra-coded picture of the inter-layer residual video, the decoder (340) can use the intra skip mode. The decoder (340) can parse information from the bit stream (304) indicating the skip modes for skipped macroblocks, or the decoder (340) can derive the skip modes without explicit signaling thereof. Details of example macroblock skip modes and derivation rules are presented below. Alternatively, the decoder (340) uses other and/or additional skip modes for skipped macroblocks.

In some embodiments, the enhancement layer decoder (340) uses skip modes for channels that are skipped in pictures of inter-layer residual video. For example, the decoder (340) parses information indicating skip modes for the channels from the enhancement layer bit stream (304). For skipped channels in a picture of the inter-layer residual video, the decoder (340) switches between using a zero skip mode and a copy skip mode. For the zero skip mode, the decoder (340) uses defined zero skip values (e.g., zero or another selected value that results in zero values after inverse remapping) for the skipped channel. For the copy skip mode, the decoder (340) uses the values of a corresponding channel of a reference picture in the picture store (364). Details of example channel skip modes are presented below. Alternatively, the decoder (340) uses other and/or additional skip modes for skipped channels.

Although FIG. 3 shows a single enhancement layer decoder (340), the inter-layer residual video can itself be separated into multiple layers (signaled as multiple enhancement layer bit streams) for decoding with separate enhancement layer decoders. A given decoding system includes one or more separate residual decoders for decoding one or more of the multiple enhancement layer bit streams.

In some cases, one or more of the enhancement layer bit streams is not present. This may happen, for example, if the bit stream is corrupted during transmission or on the storage media. Or, for some types of playback devices or some decoding scenarios, an enhancement layer bit stream is selectively dropped by a transmitter or by the decoding tool (300) so as to reduce bit rate or reduce decoding complexity.

The second inverse scaler (354) inverse scales the inter-layer residual video. For example, the second inverse scaler (354) remaps sample values of the inter-layer residual video to invert mapping that was performed during encoding. The decoding tool (300) combines the reconstructed base layer video that is output by the first inverse scaler (352) with the reconstructed inter-layer residual video (if present) that is output from the second inverse scaler (354) to produce reconstructed video (398) for output. If layers of inter-layer residual video were separated by wavelet decomposition or another mechanism during encoding, the decoding tool (300) can combine the reconstructed residual layers using wavelet synthesis or another mechanism before combining the resultant inter-layer residual video with the reconstructed base layer video.

The relationships shown between modules within the decoding tool (300) indicate general flows of information in the decoding tool (300); other relationships are not shown for the sake of simplicity. Particular embodiments of video decoding tools typically use a variation or supplemented version of the generalized decoding tool. Depending on implementation and the type of decompression desired, modules of the decoding tool can be added, omitted, split into multiple modules, combined with other modules, and/or replaced with like modules. In alternative embodiments, decoding tools with different modules and/or other configurations of modules perform one or more of the described techniques for decoding inter-layer residual video with skip modes.

IV. Macroblock Skip Modes for Inter-Layer Residual Video Coding and Decoding

In some embodiments, an encoder and decoder use macroblock skip modes that efficiently represent patterns of values that are common in certain types of inter-layer residual video content. In particular, example macroblock skip modes account for common patterns in intra-coded inter-layer residual video and provide different motion-compensated prediction options for different skip modes.

A. Generalized Technique for Selecting Macroblock Skip Modes

Figure 4:
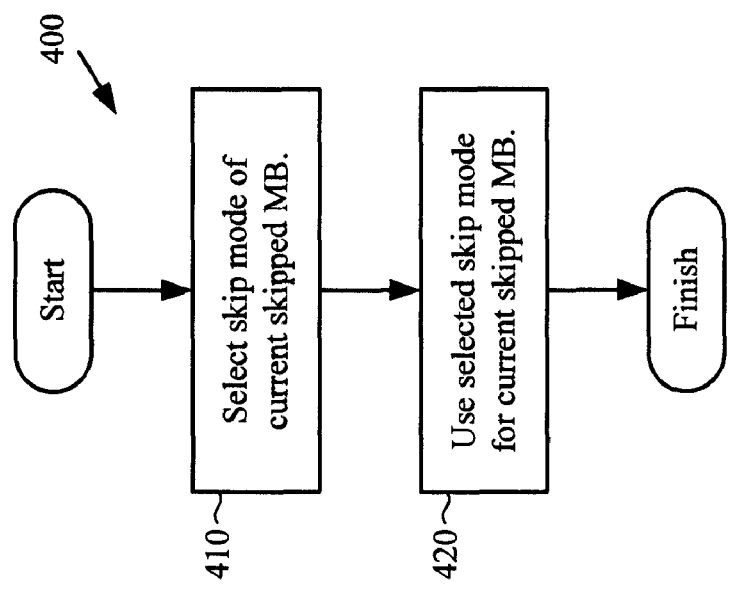
FIG. 4 is a flow chart of a generalized technique for selecting a skip mode of a skipped macroblock of inter-layer residual video during scalable video encoding or decoding.

FIG. 4 shows a generalized technique (400) for selecting macroblock skip modes during encoding or decoding. A tool such as the enhancement layer encoder (240) in the scalable video encoding tool (200) of FIG. 2, enhancement layer decoder (340) in the scalable video decoding tool (300) of FIG. 3, or other tool performs the technique (400).

To start, the tool selects (410) a skip mode of a current skipped macroblock. Example selection rules and skip modes are presented below. Alternatively, the tool uses other and/or additional skip modes or uses another skip mode selection rule for inter-layer residual video. The tool then uses (420) the selected skip mode for the current skipped macroblock.

Figure 8:
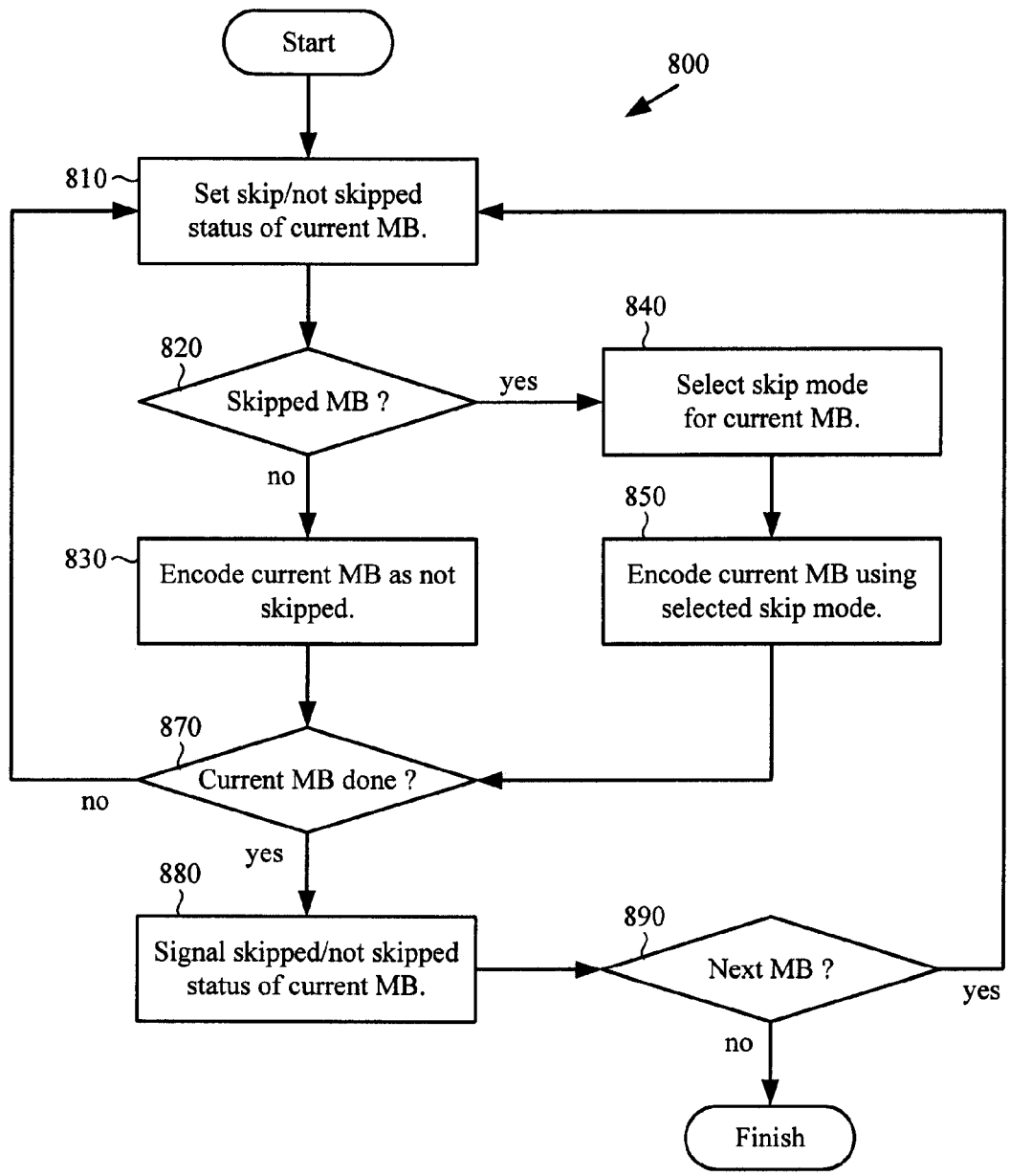
FIG. 8 is a flow chart of an example technique for encoding inter-layer residual video with selected skip modes for skipped macroblocks.
Figure 9:
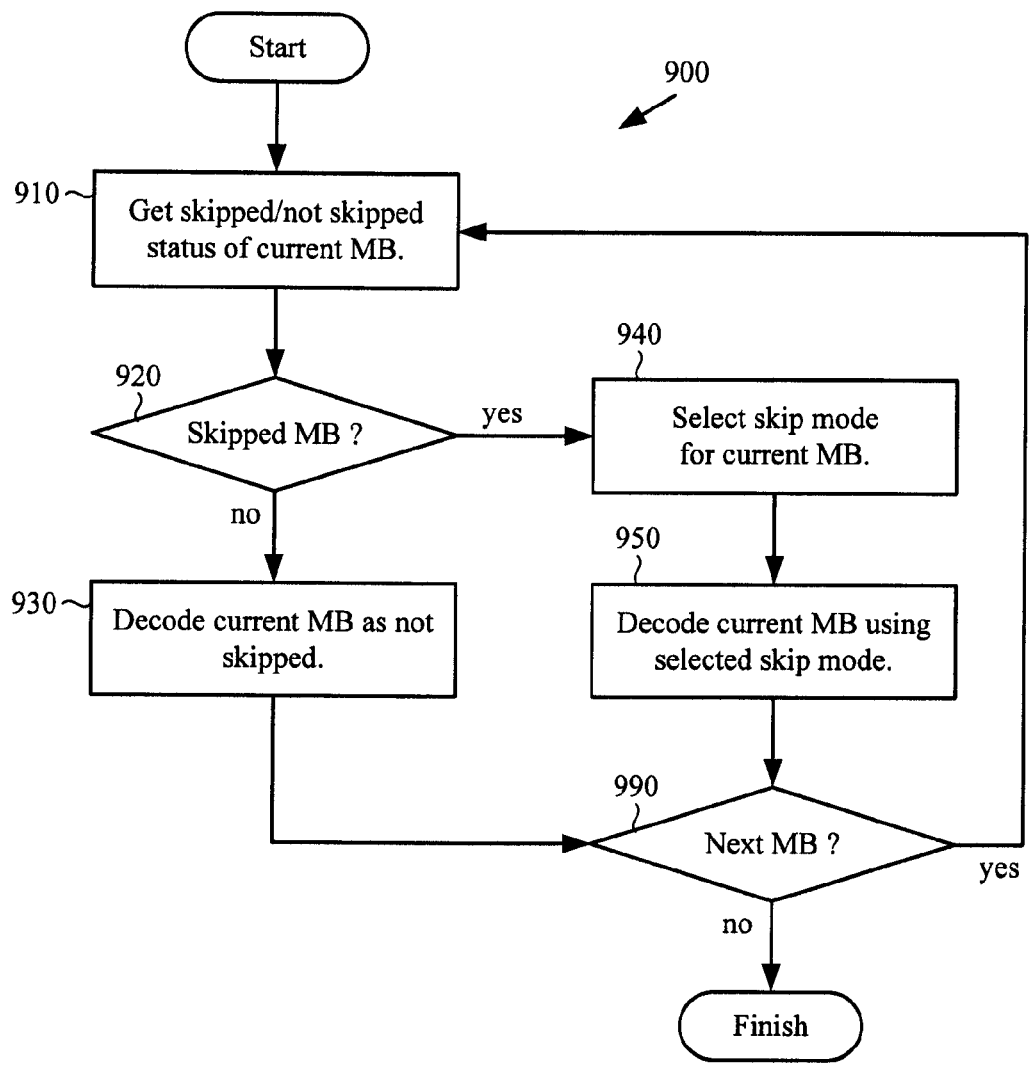
FIG. 9 is a flow chart of an example technique for decoding inter-layer residual video with selected skip modes for skipped macroblocks.

FIG. 4 shows the skip mode selection process for a single skipped macroblock. The tool repeats the technique (400) for each skipped macroblock in a picture such as an inter-coded picture of inter-layer residual video. FIG. 8 shows an example encoding technique (800) that incorporates the selection technique (400) of FIG. 4 in a larger encoding process that includes determining skipped/not skipped status for macroblocks in a picture. FIG. 9 shows an example decoding technique (900) that incorporates the selection technique (400) of FIG. 4. Alternatively, a tool uses the selection technique (400) as part of another process.

B. Example Macroblock Skip Modes and Derivation Rules

In many encoding and decoding scenarios, a large number of macroblocks of inter-layer residual video are intra-coded. Aside from intra-coded pictures (which include only intra-coded content), inter-coded pictures can include intra-coded regions. Conventional definitions of skipped macroblocks that use predicted motion are not especially helpful for intra-coded content. Example implementations of the macroblock skip modes described herein include an intra skip mode that works for intra-coded macroblocks in intra-coded pictures or inter-coded pictures of inter-layer residual video. The intra skip mode provides an efficient way to encode all-zero macroblocks of intra-coded pictures or regions.

Example implementations also include a predicted-motion skip mode that works for inter-coded macroblocks in inter-coded pictures of inter-layer residual video. The predicted-motion skip mode provides an efficient way to encode skipped macroblocks in regions of uniform or nearly uniform motion. By switching between intra skip mode and predicted-motion skip mode, pictures with a mix of intra-coded regions and motion-predicted regions can be efficiently handled.

Figure 5:
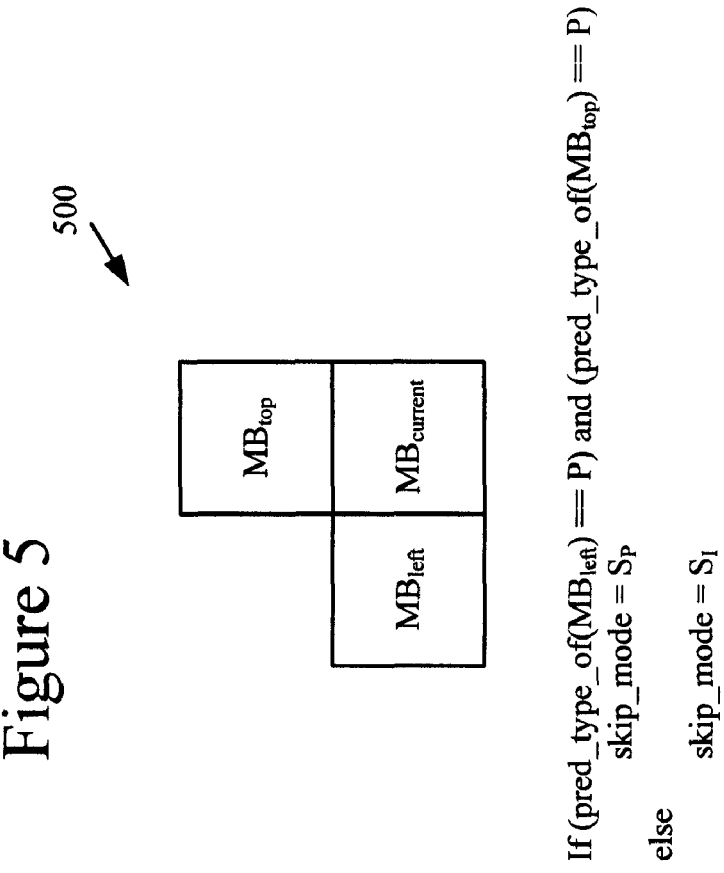
FIG. 5 is a diagram illustrating an example rule for deriving the skip mode of a skipped macroblock in inter-layer residual video.
Figure 6:
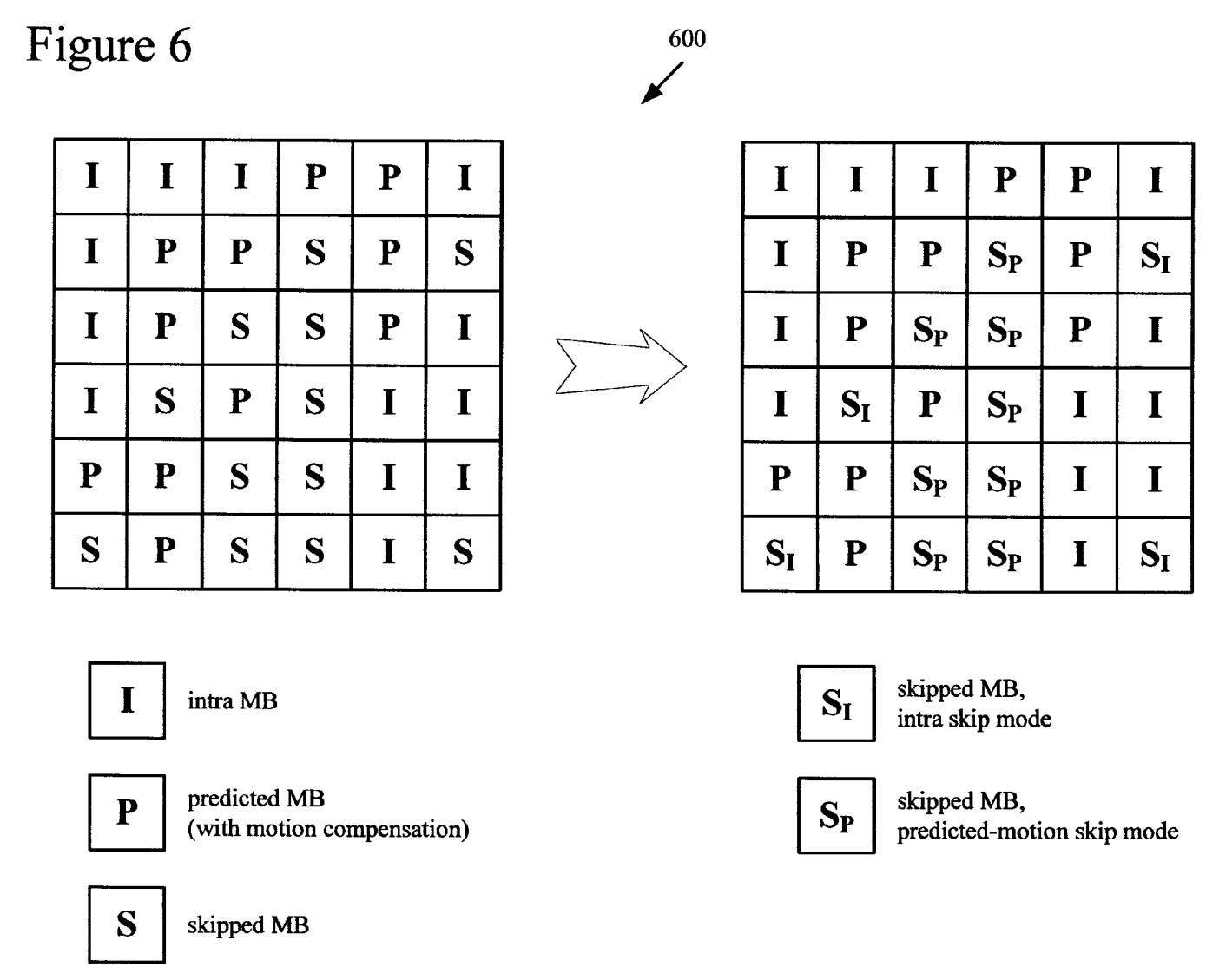

FIG. 5 shows an example skip mode derivation rule (500), and FIG. 6 shows an example application (600) of the rule (500) to a set of macroblocks in a current picture of inter-layer residual video. According to the rule (500), an encoder or decoder selects the skip mode for a current skipped macroblock $MB_{current}$ depending on context information from two context macroblocks: the macroblock $MB_{top}$ above the current skipped macroblock and the macroblock $MB_{left}$ to the left of the current skipped macroblock. If the top neighbor $MB_{top}$ and the left neighbor $MB_{left}$ are both motion compensated (both have macroblock type of P), the skip mode of $MB_{current}$ uses motion compensation (it has type P for a skipped macroblock). Otherwise, the skip mode of $MB_{current}$ does not use motion compensation (it has type I for a skipped macroblock). Either way, the current skipped macroblock $MB_{current}$ lacks residual data in the bit stream.

According to a simple "and/or" variation of the derivation rule (500), if either $MB_{top}$ or $MB_{left}$ is motion compensated (type P), or if both are motion compensated (type P), the skip mode of the current skipped macroblock $MB_{current}$ uses motion compensation (it has type P for a skipped macroblock). Otherwise, the skip mode of $MB_{current}$ does not use motion compensation (it has type I for a skipped macroblock). This "and/or" variation results in more skipped macroblocks using the predicted-motion skip mode.

FIG. 6 shows macroblocks in part of a current picture of inter-layer residual video. Skipped (S) macroblocks are interspersed among I macroblocks and P macroblocks. An encoder or decoder follows a raster scan pattern to select skip modes for the skipped macroblocks, proceeding left to right along a row of macroblocks, from the top row of the picture to the bottom row. Applying the derivation rule (500) shown in FIG. 5, the skipped macroblock in the middle of the second row uses predicted-motion skip mode (shown as $S_P$) and the skipped macroblock at the end of the second row uses intra skip mode (shown as $S_I$). (Applying the "and/or" variation, the skipped macroblock at the end of the second row would use the predicted-motion skip mode.) In the third row, both skipped macroblocks use predicted-motion skip mode, which illustrates the cascading effect of assigning a skip mode to a skipped macroblock. If a context macroblock is unavailable (e.g., because the current skipped macroblock is in the top row or left column), depending on implementation, the unavailable context macroblock can be set to I for purposes of the derivation rule (500), or the encoder and decoder can use a different derivation rule ignores the unavailable context macroblock.

Alternatively, the encoder and decoder use another derivation rule. For example, the encoder and decoder use a derivation rule that considers more or fewer context macroblocks in the picture, or considers contextual information about blocks or other areas in the picture. Or, the encoder and decoder consider context information other than macroblock type or whether a context macroblock uses motion compensation. Or, the encoder and decoder do not use a derivation rule at all—the encoder evaluates the different possible skip modes and signals in the bit stream which skip mode to use for a given macroblock.

If the current skipped macroblock $MB_{current}$ uses motion compensation, the encoder and decoder can predict its motion by computing the component-wise median of motion vectors used by neighbors such as the top neighbor $MB_{top}$ and left neighbor $MB_{left}$. The neighbors whose motion vectors are considered can be the same as the neighbors considered in the skip mode selection, or they can be a different set of neighbors. The motion prediction yields a motion vector for the current skipped macroblock $MB_{current}$, which can in turn be used when determining motion vectors for later skipped macroblocks in the picture. Alternatively, the encoder and decoder determine motion for the current skipped macroblock in some other way based upon motion information available to the encoder and decoder.

Figure 7:
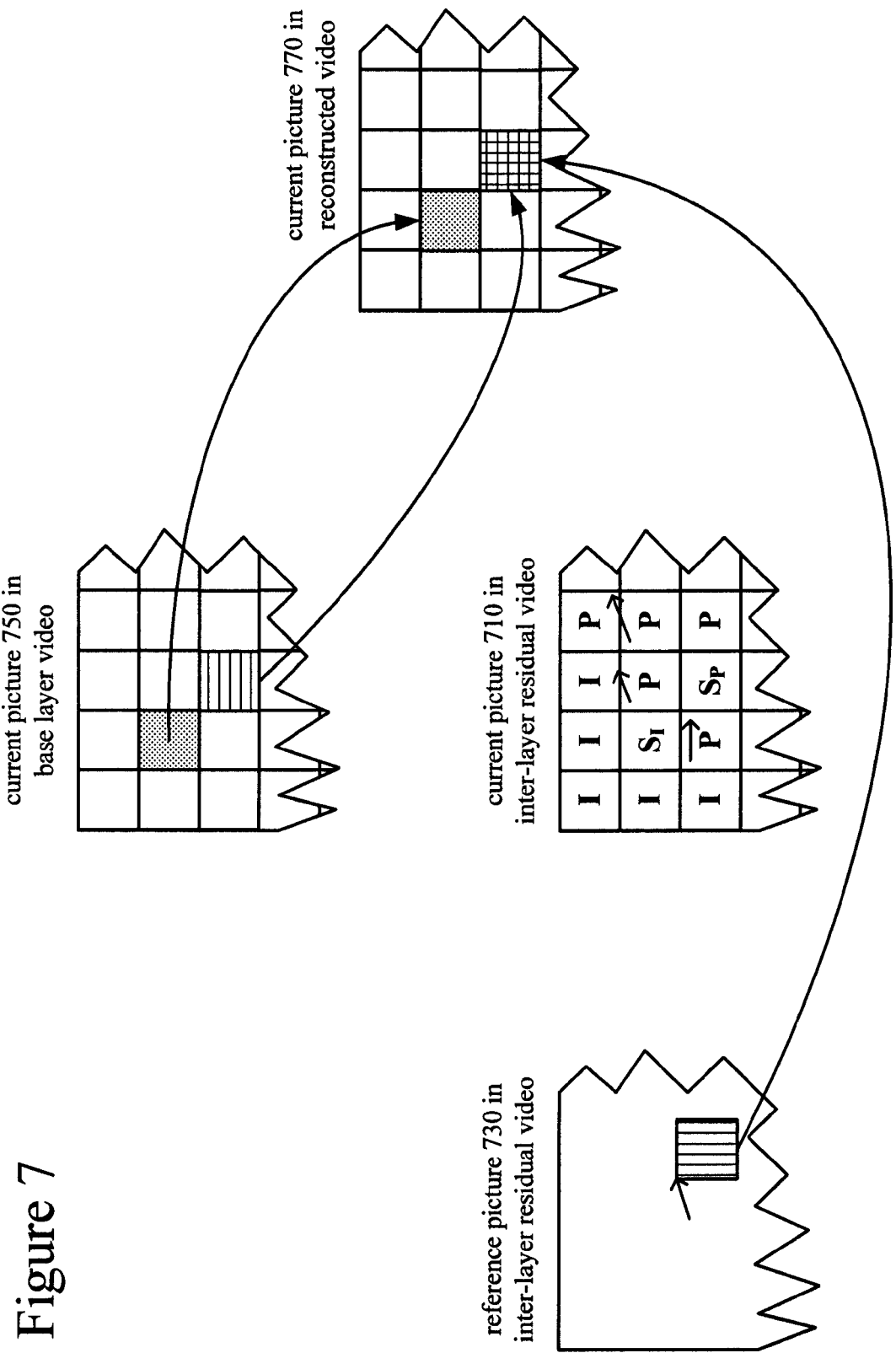
FIG. 7 is a diagram illustrating reconstruction of skipped macroblocks according to intra skip mode and predicted-motion skip mode.

FIG. 7 illustrates reconstruction of skipped macroblocks according to intra skip mode and predicted-motion skip mode. A decoder reconstructs macroblocks of a reconstructed picture (770) using a current picture (750) of reconstructed base layer video, a current picture (710) of inter-layer residual video and a reference picture (730) of the inter-layer residual video.

In the reconstructed picture (770), to reconstruct a macroblock corresponding to a skipped macroblock with intra skip mode (shown as type $S_I$) in the current picture (710) of inter-layer residual video, the decoder uses the corresponding macroblock of the current picture (750) of reconstructed base layer video. In the current picture (710) of inter-layer residual video, the intra-skipped macroblock has zero values after reconstruction—it has no motion-compensated prediction and no residual values. In some implementations, an enhancement layer decoder sets the values of intra-skipped macroblocks in the current picture (710) of inter-layer residual video to a defined value of zero. In other implementations, the enhancement layer decoder sets the values of intra-skipped macroblocks in the current picture (710) to another defined value such that the intra-skipped macroblocks in the current picture (710) will have zero values after inverse remapping. (Suppose the sample values of intra-skipped macroblocks in inter-layer residual video are meant to be zero after reconstruction. If the enhancement layer decoder simply sets the sample values to zero, inverse remapping might change the sample values to have non-zero values. Thus, based upon the parameters used in the remapping and inverse remapping, the enhancement layer decoder sets the values of intra-skipped macroblocks to a value that will be zero after inverse remapping.)

To reconstruct a macroblock corresponding to a skipped macroblock with predicted-motion skip mode (shown as type $S_P$) in the current picture (710) of inter-layer residual video, the decoder predicts a motion vector for the skipped macroblock as the median of the motion vectors of three neighbor macroblocks, then uses the motion vector to determine a motion-compensated prediction from the reference picture (730) of the inter-layer residual video. The skipped macroblock has no residual values, but the decoder combines the motion-compensated prediction from the reference picture (730) with a corresponding macroblock of the current picture (750) of reconstructed base layer video.

C. Example Technique for Selecting Macroblock Skip Modes During Encoding

FIG. 8 shows a technique (800) for selecting macroblock skip modes during encoding. An encoder such as the enhancement layer encoder (240) in the scalable video encoding tool (200) of FIG. 2 or other encoder performs the technique (800).

The encoder sets (810) skipped/not skipped status of a current macroblock and evaluates whether to use that status. The encoder checks (820) if the current macroblock is to be skipped and, if not, encodes (830) the current macroblock as not skipped. For example, the encoder computes motion vector information for the macroblock and computes residual values for blocks of the current macroblock. If the current macroblock is to be skipped, the encoder selects (840) a skip mode for the current macroblock and encodes (850) the current macroblock using the selected skip mode. For example, the encoder uses predicted motion for the skipped macroblock to compute a motion-compensated prediction for the current macroblock (for predicted-motion skip mode) or uses defined intra skip values for the skipped macroblock (for intra skip mode).

The encoder then checks (870) whether it is done encoding the current macroblock. For a given macroblock, the encoder can check one or more ways of encoding the macroblock by actually encoding the macroblock different ways and evaluating the results, or by estimating the efficiency of encoding the macroblock different ways. Generally, the encoder can consider the effect on quality (e.g., in terms of distortion) and/or bit rate (e.g., in terms of signaling costs for skip information) if the macroblock is skipped with the selected mode, and it can consider the effect on quality (e.g., in terms of distortion) and/or bit rate (e.g., in terms of signaling cost of motion vector information, residual information, etc.) if the macroblock is coded at different quality levels.

When the encoder is done with the current macroblock, the encoder signals (880) skipped/not skipped status for the current macroblock in the bit stream. For example, the encoder signals a skip bit for the current macroblock at macroblock level in the bit stream. For a non-skipped macroblock, the encoder signals a skip bit and macroblock type as well as encoded data for the macroblock. Alternatively, the encoder uses another mechanism to signal skipped/not skipped status information. For example, after finding a non-skipped macroblock, the encoder signals a skip_run code to indicate a run of one or more skipped macroblocks before the non-skipped macroblock.

The encoder continues (890) with the next macroblock in the picture as the current macroblock, until the macroblocks of the picture have been encoded. The encoder can repeat the technique (800) on picture-by-picture basis or some other basis (e.g., slice-by-slice basis).

D. Example Technique for Selecting Macroblock Skip Modes During Decoding

FIG. 9 shows a technique (900) for selecting macroblock skip modes during decoding. A decoder such as the enhancement layer decoder (340) in the scalable video decoding tool (300) of FIG. 3 or other decoder performs the technique (900).

To start, the decoder gets (910) the skipped/not skipped status of the current macroblock. For example, the decoder parses skipped/not skipped status information from a bit stream for one or more macroblocks of a picture. The decoder checks (920) whether the current macroblock is skipped and, if not, decodes (930) the current macroblock as not skipped. For example, the decoder reconstructs the current macroblock using motion compensation, reconstruction of residual values, etc. If the current macroblock is skipped, the decoder selects (940) a skip mode for the current macroblock and decodes (950) the current macroblock using the selected skip mode. For example, the decoder uses predicted motion for the skipped macroblock to compute a motion-compensated prediction for the current macroblock (for predicted-motion skip mode) or uses defined intra skip values for the skipped macroblock (for intra skip mode).

The decoder continues (990) with the next macroblock in the picture as the current macroblock, until the macroblocks of the picture have been decoded. The decoder can repeat the technique (900) on picture-by-picture basis or some other basis (e.g., slice-by-slice basis).

V. Channel Skip Modes for Inter-Layer Residual Video Coding and Decoding

In some embodiments, an encoder and decoder use channel skip modes that efficiently represent patterns of values that are common in certain types of inter-layer residual video content. In particular, example channel skip modes address situations in which significant values for a picture are isolated in one or two channels of the picture and the remaining channel(s) lack meaningful information. The example channel skip modes also address situations in which the values for a given channel do not change very much from picture to picture.

A. Generalized Technique for Determining Skipped/Non-Skipped Channels

Figure 10:
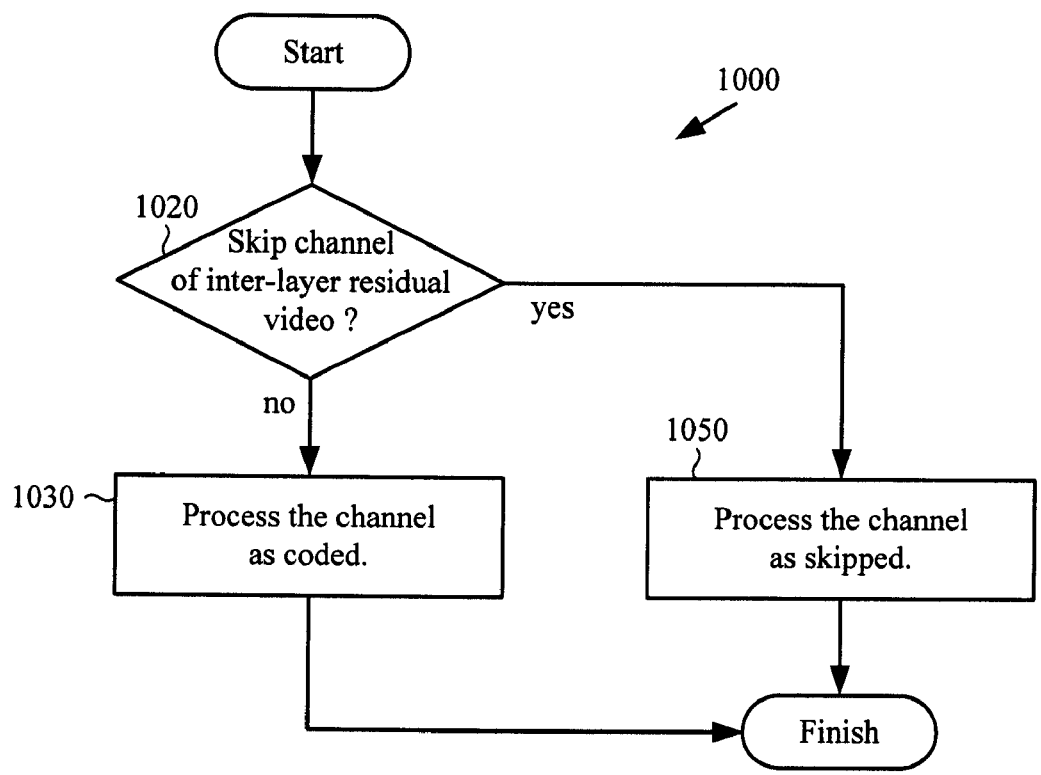
FIG. 10 is a flow chart of a generalized technique for determining skipped/not skipped status of individual channels of inter-layer residual video.

FIG. 10 shows a generalized technique (1000) for determining skipped/not skipped status of individual channels of inter-layer residual video. A tool such as the enhancement layer encoder (240) in the scalable video encoding tool (200) of FIG. 2, enhancement layer decoder (340) in the scalable video decoding tool (300) of FIG. 3, or other tool performs the technique (1000).

The tool determines (1020) whether to skip the current channel. If so, the tool processes (1050) the channel as skipped. For example, the tool selects a channel skip mode from among multiple available channel skip modes and uses the selected channel skip mode in encoding or reconstruction of the channel. Example channel skip modes are presented below. Alternatively, the tool uses other and/or additional channel skip modes. If the channel is not skipped, the tool processes (1030) the channel as coded. For example, the tool processes blocks of sample values in the channel of inter-layer residual video as normal during encoding or decoding.

Figure 12:
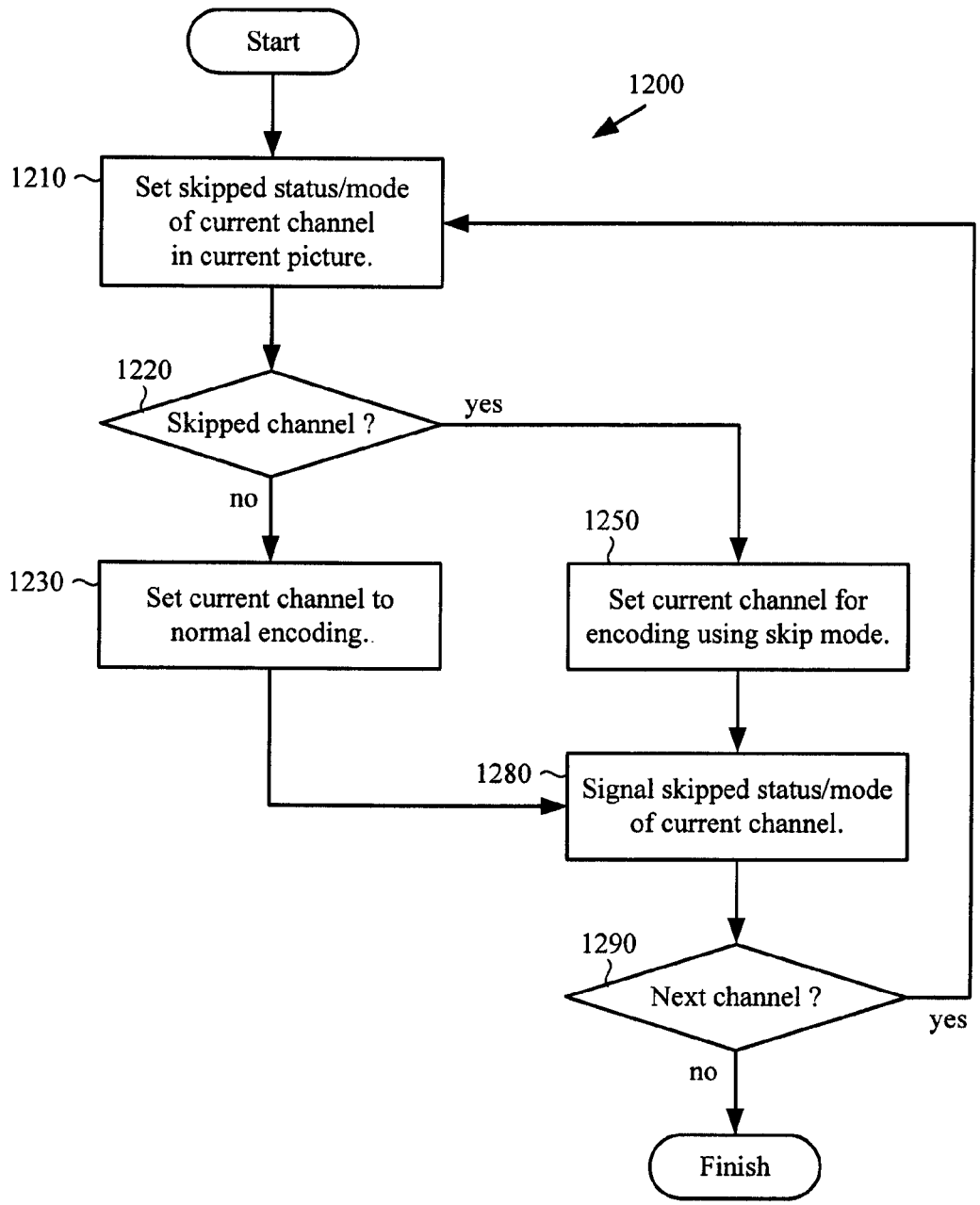
FIG. 12 is a flow chart of an example technique for encoding inter-layer residual video with skipped channels.
Figure 13:
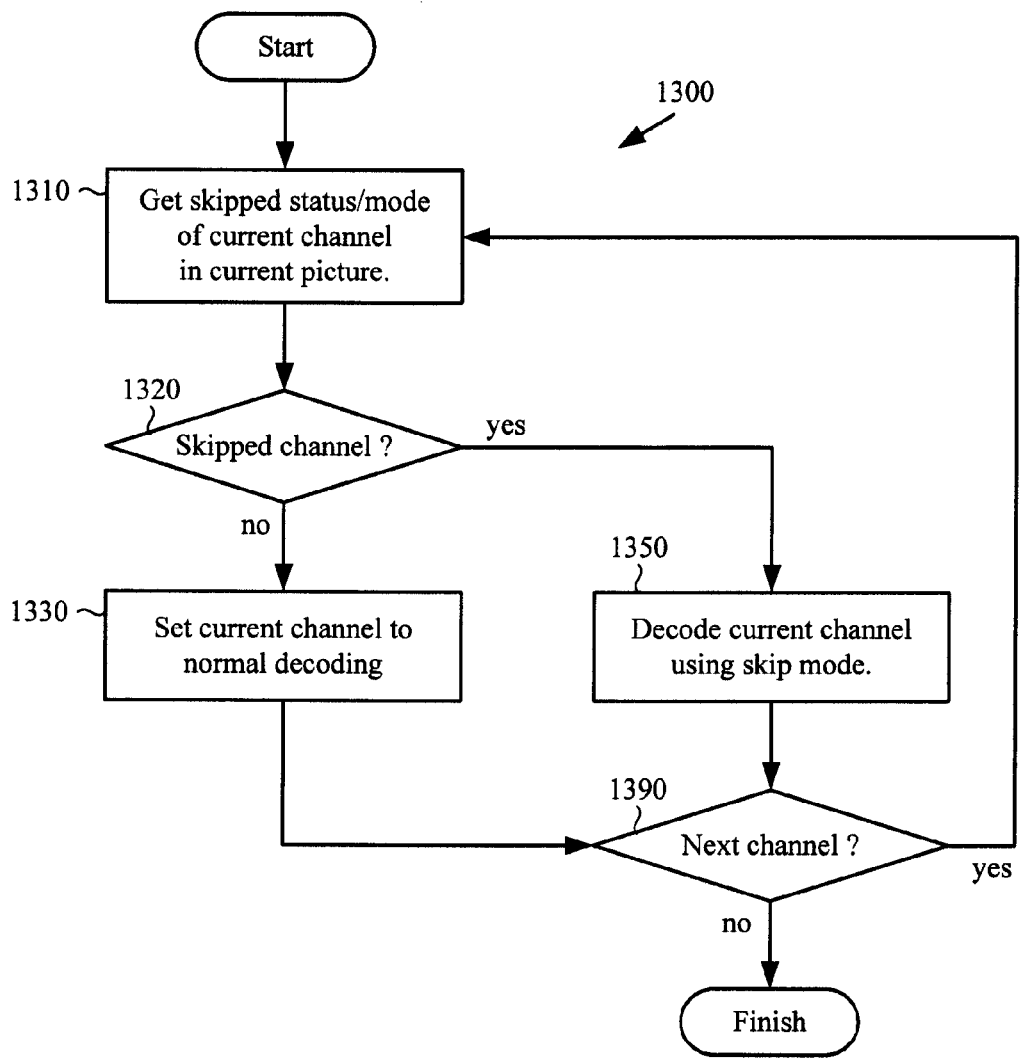
FIG. 13 is a flow chart of an example technique for decoding inter-layer residual video with skipped channels.

FIG. 10 shows the channel skip determination process for a single channel. The tool repeats the technique (1000) on a channel-by-channel basis for a picture of inter-layer residual video. FIG. 12 shows an example encoding technique (1200) that incorporates the generalized technique (1000), and FIG. 13 shows an example decoding technique (1300) that incorporates the technique (1000). Alternatively, a tool uses the technique (1000) as part of another process.

B. Example Channel Skip Modes

In many encoding and decoding scenarios, the significant values in a picture of inter-layer residual video are concentrated in one or two channels, while the other channel(s) include mostly zero values. For example, when base layer video is encoded with high quality, the luma channel of a picture can have mostly zero values while the chroma channels include significant values for chroma sampling rate residual information. Example implementations include a zero skip mode for channels. According to the zero skip mode, the sample values of an individual skipped channel are encoded and reconstructed as defined zero skip values.

In another common pattern in inter-layer residual video, the values of a channel are relatively consistent from picture to picture. For example, when base layer video is encoded at low quality, in low motion scenes the values of a given channel can be consistent from picture to picture. Example implementations include a copy skip mode for channels. According to the copy skip mode, the sample values of an individual skipped channel in a current picture are copied from the corresponding channel in a reference picture of the inter-layer residual video.

Figure 11:
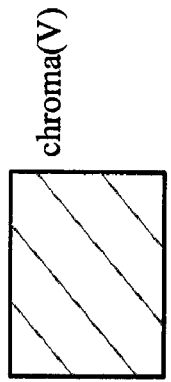
FIG. 11 is a diagram illustrating example skip modes for a channel of a picture.
Figure 11:
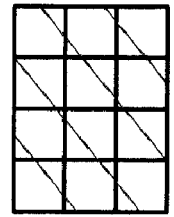
Figure 11:
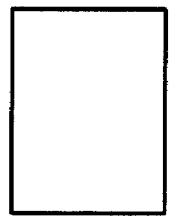
Figure 11:
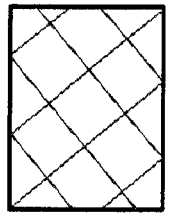
Figure 11:
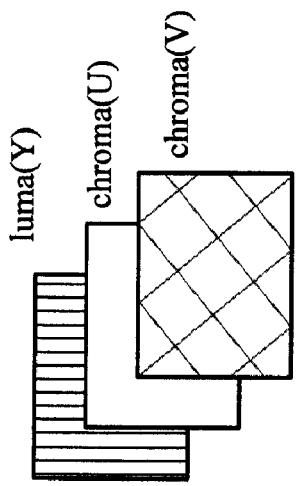

FIG. 11 shows example skip modes for a current channel (1110) of a current picture of inter-layer residual video. The current channel (1110) is a U channel but can instead be a luma channel or other chroma channel. If the current channel (1110) is not skipped, the channel (1110) is split into blocks for purposes of encoding and decoding. If the current channel (1110) is skipped in zero skip mode, the channel (1110) is encoded and reconstructed with samples of a defined zero skip value. In some implementations, an enhancement layer decoder sets the values of a zero-skipped channel of inter-layer residual video to a defined value of zero. In other implementations, the enhancement layer decoder sets the values of a zero-skipped channel to another defined value such that the zero-skipped channel will have zero values after inverse remapping. (Suppose the sample values of a zero-skipped channel in inter-layer residual video are meant to be zero after reconstruction. If the enhancement layer decoder simply sets the sample values to zero, inverse remapping might change the sample values to have non-zero values. Thus, based upon the parameters used in the remapping and inverse remapping, the enhancement layer decoder sets the values of the zero-skipped channel to a value that will be zero after inverse remapping.)

If the current channel (1110) is skipped in copy skip mode, sample values from the corresponding channel of a reference picture (1130) are copied to the current channel.

An encoder signals the skipped/not skipped status for a channel in a bit stream, and a decoder parses the information from the bit stream. For example, in a picture header the encoder signals three bits that indicate which of three channels Y, U and V are skipped in the bit stream.

TABLE 1

Example syntax elements for skipped/not skipped status

| syntax element | bit | possible meanings |
| --- | --- | --- |
| Y_CHANNEL_SKIPPED | 1 | 0: skipped |
| U_CHANNEL_SKIPPED | 1 | 1: coded |
| V_CHANNEL_SKIPPED | 1 | |

If X_CHANNEL_SKIPPED (where X is Y, U or V) is true, then no information is coded for channel X in the bit stream.

Alternatively, an encoder signals both the skipped/not skipped status and skip mode for a channel in the bit stream, and a decoder parses the information from the bit stream. For example, in a picture header the encoder signals three two-bit codes that indicate which of three channels Y, U and V are skipped in the bit stream, and which skip mode is used for any skipped channel.

TABLE 2

Example syntax elements for skipped/not skipped status and skip modes

| syntax element | bits | possible meanings |
| --- | --- | --- |
| Y_CHANNEL_SKIPPED_MODE | 2 | 01: skipped, reconstruct to defined zero |
| U_CHANNEL_SKIPPED_MODE | 2 | skip values |
| V_CHANNEL_SKIPPED_MODE | 2 | 10: skipped, reconstruct by copying corresponding channel of reference picture |
| | | 00: not skipped |

For the copy skip mode, the encoder can signal which reference picture to use at picture level or another level. Or, the encoder and decoder use a default reference picture for the current picture being decoded, or otherwise determine the reference picture without explicit signaling.

Alternatively, the encoder and decoder follow another syntax for signaling channel skip information, for example, a syntax that uses variable length codes with shorter codes for more common channel skip options.

C. Example Technique for Determining Skipped Channels During Encoding

FIG. 12 shows a technique (1200) for determining skipped channels and channel skip modes during encoding. An encoder such as the enhancement layer encoder (240) in the scalable video encoding tool (200) of FIG. 2 or other encoder performs the technique (1200).

The encoder sets (1210) the skipped/not skipped status of a current channel as well as the channel skip mode if the channel is to be skipped. The encoder considers one or more ways of encoding the current channel with different skip status and skip mode options. Generally, the encoder can consider the effect on quality (e.g., in terms of distortion) if the channel is skipped with zero skip mode, skipped with copy skip mode, or not skipped. The encoder can also consider the effect on bit rate (e.g., in terms of bit rate) if the channel is skipped with zero skip mode, skipped with copy skip mode, or not skipped. As a simple estimation, to determine whether to use zero skip mode, the encoder can compare a summary measure of the values in a channel to a threshold, using zero skip mode if the summary measure is under the threshold. Or, to determine whether to use copy skip mode, the encoder can measure the similarity between the sample values of a channel in the current picture and the sample values of the corresponding channel in a reference picture.

If the current channel is not to be skipped (1220), the encoder sets (1230) the current channel for normal encoding. If the current channel is to be skipped, the encoder sets (1250) the current channel for encoding using the set skip mode. For example, according to the skip mode, during encoding, the encoder copies sample values from a corresponding channel in a reference picture (for copy skip mode) or uses defined zero skip values for the skipped channel (for zero skip mode).

The encoder signals (1280) the skipped/not skipped status and skip mode for the current channel in the bit stream. For example, the encoder signals the channel skip information using the syntax elements shown in Table 2. Alternatively, the encoder uses another bit stream syntax to signal channel skip information. The encoder continues (1290) with the next channel in the picture as the current channel, until the encoder has decided the skipped/not skipped status and skip modes of the channels of the picture of inter-layer residual video. The encoder can repeat the technique (1200) on picture-by-picture basis or some other basis.

D. Example Technique for Determining Skipped Channels During Decoding

FIG. 13 shows a technique (1300) for determining skipped channels and channel skip modes during decoding. A decoder such as the enhancement layer decoder (340) in the scalable video decoding tool (300) of FIG. 3 or other decoder performs the technique (1300).

The decoder gets (1310) the skipped/not skipped status of a current channel as well as the skip mode if the channel is to be skipped. For example, the decoder parses channel skip information signaled using the syntax elements shown in Table 2. Alternatively, the decoder gets channel skip information signaled using another bit stream syntax.

If the current channel is not to be skipped (1320), the decoder sets (1330) the current channel for normal decoding. If the current channel is to be skipped, the decoder decodes (1350) the current channel using the set skip mode. For example, according to the skip mode, the decoder copies sample values from a corresponding channel in a reference picture (for copy skip mode) or uses defined zero skip values for the skipped channel (for zero skip mode).

The decoder continues (1390) with the next channel in the picture as the current channel, until the decoder has decided the skipped/not skipped status and skip modes of the channels of the picture of inter-layer residual video. The decoder can repeat the technique (1300) on picture-by-picture basis or some other basis.

E. Combined Implementations

In some implementations, an encoder and decoder use channel skip modes and macroblock skip modes. The encoder and decoder follow a defined set of rules, which depends on implementation, or follow decisions indicated by signaled decision information, to resolve potential inconsistencies. For example, suppose a bit stream includes channel skip information in a picture header and includes encoded data for macroblocks on a macroblock-by-macroblock basis at macroblock level. Even if a channel is skipped, a given macroblock having one or more blocks in the channel may be coded. Depending on implementation of rules or on signaled decision information, the encoder and decoder could overwrite the part of the skipped channel with blocks(s) for the coded macroblock, or the encoder and decoder could skip the blocks of the coded macroblock.

One example set of rules generally favors macroblock skip decisions over channel skip decisions. If a macroblock is coded, the encoder and decoder code/decode the block(s) of the macroblock in a given channel whether the channel is coded, skipped in copy skip mode or skipped in zero skip mode. Similarly, if a macroblock is skipped with predicted-motion skip mode, the encoder and decoder use predicted-motion skip mode for the block(s) of the macroblock in any given channel. If a macroblock is skipped with intra skip mode, the encoder and decoder use defined intra skip values for the block(s) of the macroblock in any given channel.

Another example set of rules generally favors channel skip decisions over macroblock skip decisions when a channel is skipped—the sample values for a skipped channel remain even if a given macroblock is coded or skipped in a way that would yield different values. Alternatively, the encoder and decoder use another set of rules to resolve inconsistencies between macroblock skip decisions and channel skip decisions.

Or, an encoder signals decision information indicating whether to favor channel skip decisions over macroblock skip decisions; a decoder parses the decision information and applies it in decoding. For example, the encoder signals one bit per channel in an enhancement layer bit stream to indicate whether to favor channel skip mode or macroblock skip mode for the channel. Depending on implementation, the three bits of decision information for three channels can be signaled for a sequence, a group of pictures, a picture or on some other basis. Alternatively, the encoder signals one bit per macroblock in the enhancement layer bit stream to indicate on a macroblock-by-macroblock basis whether to favor channel skip mode or macroblock skip mode.

VI. Alternatives

Many of the examples described herein involve encoding and decoding of inter-layer residual video for scalable video applications. Alternatively, one or more of the techniques for macroblock skip modes or channel skip modes is used in another application, for example, base layer video encoding and decoding.

Many of the examples described herein for macroblock skip modes involve selection between multiple available skip modes. Alternatively, for intra-coded inter-layer residual video content, an encoder and decoder have a single skip mode—the intra-skip mode. A given macroblock in the intra-coded content can be skipped using the intra-skip mode or not skipped.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of processing inter-layer residual video, the method comprising:

with a computing device implements a video encoder, encoding inter-layer residual video to produce at least part of a bit stream of encoded for the inter-layer residual video, wherein the encoding includes processing plural macroblocks of a current picture of the inter-layer residual video, including, for a current macroblock of the plural macroblocks that is skipped:

selecting a skip mode for the current macroblock that is skipped, wherein the skip mode is selected from among plural available skip modes, including;

determining context information for each of one or more context macroblocks in the current picture around the current macroblock that is skipped; and determining the skip mode based upon the context information for the one or more context macroblocks; and using the selected skip mode for the current macroblock that is skipped; and outputting the at least part of the bit stream, wherein the bit stream of encoded data for the inter-layer residual video includes macroblock skip information indicating which of the plural macroblocks are skipped.

2. The method of claim 1 wherein the plural available skip modes include intra skip mode and predicted-motion skip mode.

3. The method of claim 1 wherein:

the bit stream of encoded data for the inter-layer residual video lacks information indicating the selected skip modes of those of the plural macroblocks that are skipped.

4. The method of claim 1 wherein the context information is macroblock type.

5. The method of claim 1 wherein:

the selecting the skip mode for the current macroblock that is skipped includes selecting between first and second skip modes depending on whether any of the one or more context macroblocks in the current picture use motion compensation;

use of the first skip mode includes performing motion compensation according to motion derived from motion information of the one or more context macroblocks; and use of the second skip mode includes no motion compensation.

6. The method of claim 1 wherein, for the current macroblock that is skipped, the processing includes:

evaluating, in terms of rate-distortion performance, results of the using the selected skip mode for, the current macroblock that is skipped during the encoding; and deciding that the current macroblock is skipped.

7. The method of claim 1 wherein the current picture has plural channels, and wherein the method further comprises, as part of the encoding for the current picture:

determining on a channel-by-channel basis whether to skip the plural channels of the current picture; and in the bit stream, signaling channel skip information indicating which of the plural channels are skipped.

8. The method of claim 2 wherein the selected skip mode for the current macroblock is intra skip mode, and wherein the using the intra skip mode for the current macroblock includes assigning defined intra skip values to the current macroblock.

9. The method of claim 2 wherein the selected skip mode for the current macroblock is the predicted-motion skip mode, and wherein the using the predicted-motion skip mode for the current macroblock includes assigning, to the current macroblock, values of a motion-compensated prediction from a reference picture of the inter-layer residual video.

10. A computer system comprising a processor, memory and storage media having stored thereon computer software for causing the computer system to perform a method comprising:

processing plural macroblocks of a current intra-coded picture of inter-layer residual video, the current intra-coded picture having only intra-coded content encoded without motion compensation, wherein the processing includes, for a current macroblock of the plural macroblocks that is skipped:

selecting intra skip mode for the current macroblock that is skipped; and using the intra skip mode for the current macroblock that is skipped, including assigning defined intra skip values to the current macroblock that is skipped; and outputting a result of the processing;

wherein a bit stream of encoded data for the inter-layer residual video includes macroblock skip information indicating which of the plural macroblocks of the current intra-coded picture are skipped.

11. The computer system of claim 10 wherein the defined intra skip values are selected such that any intra-skipped macroblocks of the current intra-coded picture are reconstructed with zero values, and wherein the method further comprises:

receiving at least part of the bit stream;

decoding the inter-layer residual video using the at least part of the bit stream, wherein the decoding includes the processing the plural macroblocks, and wherein the result of the processing is the decoded inter-layer residual video; and combining the decoded inter-layer residual video with reconstructed base layer video to produce reconstructed video for output.

12. A method of processing inter-layer residual video, the method comprising:

with a computing device that implements a video encoder, encoding inter-layer residual video to produce at least part of a bit stream of encoded data for the inter-layer residual video, wherein the inter-layer residual video is organized as plural channels according to a color space, and wherein the encoding includes processing the plural channels of the inter-layer residual video, including for each of the plural channels:

determining whether to skip the channel of the inter-layer residual video;

if the channel is skipped, processing the channel as skipped; and if the channel is not skipped, processing the channel as coded;

outputting the at least part of the bit stream, wherein the bit stream of encoded data for the inter-layer residual video includes channel skip information indicating which of the plural channels are skipped.

13. The method claim 12 wherein the determining further comprises, for one of the plural channels that is skipped, selecting a channel skip mode from among plural available channel skip modes, and wherein the channel skip information also indicates the selected channel skip mode.

14. The method of claim 12 wherein, for each of the plural channels in a current picture, the channel skip information includes a code that indicates whether the channel is (a) skipped using defined zero skip values, (b) skipped by copying values of a corresponding channel from a reference picture, or (c) not skipped.

15. The method of claim 12 wherein, for each of the plural channels in a current picture, the channel skip information includes a single bit code that indicates whether the channel is skipped or not skipped.

16. The method of claim 12 wherein the plural channels include a luma channel and plural chroma channels.

17. A computer system comprising a processor, memory and storage media having stored thereon computer software for causing the computer system to perform a method of processing inter-layer residual video, the method comprising:
receiving at least part of a bit stream of encoded data for inter-layer residual video, wherein the bit stream includes macroblock skip information indicating which of plural macroblocks of a current picture of the inter-layer residual video are skipped;
with a computing device that implements a video decoder, decoding the inter-layer residual video, wherein the decoding includes processing the plural macroblocks of the current picture of the inter-layer residual video, including, for a current macroblock of the plural macroblocks that is skipped:
selecting a skip mode for the current macroblock that is skipped, wherein the skip mode is selected from among plural available skip modes, including:
determining context information for each of one or more context macroblocks in the current picture around the current macroblock that is skipped; and
determining the skip mode based upon the context information for the one or more context macroblocks; and
using the selected skip mode for the current macroblock that is skipped; and
combining the decoded inter-layer residual video with reconstructed base layer video to produce reconstructed video for output.

18. The computer system of claim 17 wherein the plural available skip modes include intra skip mode and predicted-motion skip mode.

19. The computer system of claim 17 wherein:
the bit stream of encoded data for the inter-layer residual, video lacks information indicating the selected skip modes of those of the plural macroblocks that are skipped.

20. The computer system of claim 17 wherein the context information is macroblock type.

21. The computer system of claim 17 wherein:
the selecting the skip mode for the current macroblock that is skipped includes selecting between first and second skip modes depending on whether any of the one or more context macroblocks in the current picture use motion compensation;
use of the first skip mode includes performing motion compensation according to motion derived from motion information of the one or more context macroblocks; and
use of the second skip mode includes no motion compensation.

22. The computer system of claim 17 wherein the current picture has plural channels, and wherein the method further comprises, as part of the decoding for the current picture:
from the bit stream, parsing channel skip information indicating which of the plural channels are skipped; and
determining on a channel-by-channel basis whether to skip the plural channels of the current picture.

23. The computer system of claim 18 wherein the selected skip mode for the current macroblock is intra skip mode, and wherein the using the intra skip mode for the current macroblock includes assigning defined intra skip values to the current macroblock.

24. The computer system of claim 18 wherein the selected skip mode for the current macroblock is the predicted-motion skip mode, and wherein the using the predicted-motion skip mode for the current macroblock includes assigning, to the current macroblock, values of a motion-compensated prediction from a reference picture of the inter-layer residual video.

25. A method of processing inter-layer residual video, the method comprising:
receiving at least part of a bit stream of encoded data for inter-layer residual video that is organized as plural channels according to a color space, wherein the bit stream includes channel skip information indicating which of the plural channels are skipped;
with a computing device that implements a video decoder, decoding the inter-layer residual video, wherein the decoding includes processing the plural channels of the inter-layer residual video, including for each of the plural channels:
determining whether to skip the channel of the inter-layer residual video;
if the channel is skipped, processing the channel as skipped; and
if the channel is not skipped, processing the channel as coded; and
combining the decoded inter-layer residual video with reconstructed base layer video to produce reconstructed video for output.

26. The method claim 25 wherein the determining further comprises, for one of the plural channels that is skipped, selecting a channel skip mode from among plural available channel skip modes, and wherein the channel skip information also indicates the selected channel skip mode.

27. The method of claim 25 wherein, for each of the plural channels in a current picture, the channel skip information includes a code that indicates whether the channel is (a) skipped using defined zero skip values, (b) skipped by copying values of a corresponding channel from a reference picture, or (c) not skipped.

28. The method of claim 25 wherein, for each of the plural channels in a current picture, the channel skip information includes a single bit code that indicates whether the channel is skipped or not skipped.

29. The method of claim 25 wherein the plural channels include a luma channel and plural chroma channels.

* * * * *